(12) United States Patent
Andoh et al.

(10) Patent No.: US 11,931,988 B2
(45) Date of Patent: Mar. 19, 2024

(54) METHOD FOR MANUFACTURING A COMPOSITE OF ALUMINUM ALLOY

(71) Applicant: TAISEI PLAS CO., LTD., Tokyo (JP)

(72) Inventors: Naoki Andoh, Tokyo (JP); Yoshihiro Yamaguchi, Tokyo (JP)

(73) Assignee: TAISEI PLAS CO., LTD., Tokyo (JP)

( * ) Notice: Subject to any disclaimer, the term of this patent is extended or adjusted under 35 U.S.C. 154(b) by 245 days.

(21) Appl. No.: 17/517,679

(22) Filed: Nov. 3, 2021

(65) Prior Publication Data

US 2022/0055346 A1 Feb. 24, 2022

Related U.S. Application Data

(62) Division of application No. 16/388,865, filed on Apr. 18, 2019, now abandoned.

(30) Foreign Application Priority Data

Apr. 20, 2018 (JP) .................................. 2018-81709

(51) Int. Cl.
*B32B 15/20* (2006.01)
*B29C 45/14* (2006.01)
(Continued)

(52) U.S. Cl.
CPC ........ *B32B 15/20* (2013.01); *B29C 45/14008* (2013.01); *B29C 45/14795* (2013.01); *B32B 15/08* (2013.01); *B32B 15/085* (2013.01); *B32B 27/20* (2013.01); *B29K 2023/00* (2013.01); *B29K 2081/04* (2013.01); *B29K 2705/02* (2013.01); *B32B 2270/00* (2013.01); *B32B 2307/538* (2013.01)

(58) Field of Classification Search
None
See application file for complete search history.

(56) References Cited

U.S. PATENT DOCUMENTS 9,808,974 B2 * 11/2017 Sun .................. B32B 27/20
2014/0363659 A1 * 12/2014 Sun .................. C25D 11/16
428/307.3

FOREIGN PATENT DOCUMENTS

WO WO-2016101694 A1 * 6/2016
WO WO-2016101703 A1 * 6/2016
WO WO-2016101705 A1 * 6/2016

* cited by examiner

*Primary Examiner* — Yung-Sheng M Tsui
(74) *Attorney, Agent, or Firm* — JCIPRNET

(57) ABSTRACT

An aluminum alloy material is prepared that has surface configuration of threefold irregularities such that rough surface having surface roughness of 10 to 100 μm period is observed with an electron microscope in a magnification of 1000 times, surface having fine irregularities of 1 to 5 μm period based on crystal grain boundary is observed with an electron microscope in a magnification of 10000 times and surface having ultrafine irregularities of 30 to 100 nm period is confirmed with an electron microscope in a magnification of 100000 times. Aluminum alloy material is integrally joined with a resin composition consisting of a total resin part containing polyphenylene sulfide resin by 70 mass % or more of the resin part, modified polyolefin resin by 30 mass % or less of the resin part and a resin of third component having ability for promoting compatibility of polyphenylene sulfide resin and modified polyolefin resin.

2 Claims, 6 Drawing Sheets

(51) Int. Cl.
B32B 15/08 (2006.01)
B32B 15/085 (2006.01)
B32B 27/20 (2006.01)
B29K 23/00 (2006.01)
B29K 81/00 (2006.01)
B29K 705/02 (2006.01)

METHOD FOR MANUFACTURING A COMPOSITE OF ALUMINUM ALLOY

CROSS-REFERENCE TO RELATED APPLICATION

This is a divisional application of patent application Ser. No. 16/388,865, filed on Apr. 18, 2019, which claims the priority benefit of Japanese Patent Application No. 2018-81709, filed on Apr. 20, 2018. The entirety of each of the above-mentioned patent applications is hereby incorporated by reference herein and made a part of this specification.

FIELD OF THE INVENTION

The present invention relates to a composite of a metal and polyphenylene sulfide (hereinafter referred to as "PPS") resin composition joined by injection molding, and a method for manufacturing the same. Specifically, the present invention relates to a composite of a metal and PPS resin that has properties suitably used for moving machines such as automobiles, outdoor facilities, machines used outdoor, or the like.

BACKGROUND OF THE INVENTION

Technology for making strong joining of a metal with another metal or of a metal with a synthetic resin is needed not only in fields of parts manufacturing industries, such as manufacturing of parts for automobiles, consumer electric products, industrial machinery and so forth, but also in wider fields of industry, and many adhesive agents have been developed for use there. Such joining technology is one constituting a backbone for all manufacturing industries. On the other hand, various joining methods that do not involve use of an adhesive have been studied and proposed conventionally. Among them, NMT (Nano Molding Technology), developed and named by the present inventors, gave a conspicuous influence in manufacturing industry. NMT is a technology of joining an aluminum alloy with a resin composition providing a method, in which a molten engineering resin is injected onto a metal part preliminarily inserted into a metallic mold for injection molding thereby forming a resin portion and at the same time the molded article and the metal part are joined (hereinafter this will be referred to as "joining by injection molding").

Patent Document 1 discloses a technology (NMT), in which a PPS resin composition is joined by injection molding onto an aluminum alloy that has been subjected to a specific surface treatment. Patent Document 2 discloses a technology ("NMT 2" as named by the present inventors) in which joining strength by injection molding is raised, improving surface treatment method of aluminum alloy in NMT. In the surface treatment method of NMT and NMT 2, a method is employed in which amine molecules are chemically adsorbed onto surface of an aluminum alloy.

Amine molecules are not easily adsorbed onto many kinds of metal materials other than aluminum alloy. On the other hand, study and development of resin compositions suitable for joining by injection molding used in NMT have been advanced, and it has been clarified that, with these resin compositions used, joining by injection molding with various metal materials can be performed even without existence of adsorbed amine molecules, only by adding an operation of forming fine surface irregularities suitable for each of various metal materials. That is, the present inventors proposed a technology (new NMT) in which various metal materials can be joined with resin compositions by injection molding even for one with a treated surface having no adsorbed amine molecules. That is, the new NMT can be applied to all metal materials containing aluminum alloy (see the disclosure of Patent Document 3 for aluminum alloy).

NMT, NMT 2 and new NMT, as referred to in the present invention, will be explained in more details below.

(NMT)

In NMT, as a technology of joining by injection molding using an aluminum alloy, following four or five conditions are defined as required conditions for realizing it. For the first, following (1) and (2) are required conditions for the side of an aluminum alloy. It is called as "NMT treatment" to treat the surface of aluminum alloy chemically so as to satisfy the two conditions.

(1) The entire surface should be covered with ultrafine concaves having diameter of 20 to 50 nm.
(2) Water soluble amine compounds should be chemically adsorbed to the surface layer.

In the next, following two or three conditions (3) to (5) are required conditions for the side of a resin composition to be injected.

(3) A resin composition should be used such that contains highly crystalline thermoplastic resin as a main component.
(4) The highly crystalline resin composition should react chemically with amine molecules under high temperature.
(5) The resin composition should contain a resin as an auxiliary component that is compatibly soluble into the main component resin or can be compatibly soluble by adding a third resin component, even if not compatibly soluble itself into the main component resin.

The above (1) to (4) are required conditions and addition of the condition (5) makes joining strength by injection molding higher. NMT and NMT 2 are such that the above (1) to (4) are satisfied and hydrazine hydrate is selected as the amine compounds in the above (2).

(NMT 2)

NMT was discovered initially with PBT (polybutylene terephthalate resin), after then it was confirmed that also PPS can be used (Patent Document 1), and in the next it was confirmed that also polyamide resin or the like can be used. After this, a method concerning surface treatment of aluminum alloy was discovered such that joining strength by injection molding is raised adjusting chemical adsorption rate of hydrazine hydrate (Patent Document 2) and this was named as "NMT 2" by the present inventors.

(New NMT)

After the discovery of NMT, the present inventors developed new NMT in which various metal materials and resin compositions can be joined by injection molding even without surface treatment with amine molecules. Following five conditions were defined as required conditions for realizing it. At first, following three conditions are required for the side of a metal material. It is referred to as "new NMT treatment" in the present invention to make chemical surface treatment of a metal material so as to satisfy the three conditions.

(1) The entire surface should be covered with a surface having surface roughness of 0.8 to 10 μm period.
(2) An ultrafine irregular surface of 10 to 300 nm period should be formed on the surface having the surface roughness.

(3) The entire surface should be covered with a thin hard layer of metal oxide, metal phosphate or ceramic substance.

In the next, following two conditions are required for the side of a resin composition to be injected.

(4) A resin composition containing highly crystalline thermoplastic resin as a main constituent should be used.

(5) The resin composition should contain a resin as an auxiliary constituent that is compatibly soluble into the main constituent resin or can be compatibly soluble by adding a third resin constituent, even if not compatibly soluble itself into the main component resin.

As a natural matter, specific surface treatment methods, that is, methods of the above "new NMT treatment" are various according to kinds of metals or metal alloys. Comparing the five conditions of the "new NMT" with the five conditions of the above mentioned "NMT", both are substantially same regarding resins to be injected, while there is a large difference between one and the other regarding surface treatment methods of metal materials. This will be explained bellow, comparing NMT with new NMT, in both of which aluminum alloy is used.

(Comparison of NMT with New NMT)

In NMT, it is postulated that a composite with a high joining strength by injection molding can be formed through penetration of injected resin that can easily be subjected to chemical reaction with the amine molecules under high temperature into the ultrafine concaves in a situation where the amine molecules are chemically adsorbed onto the ultrafine concaves on the surface of aluminum alloy. Also, if the injected resin is a resin composition that satisfies the above condition (5), joining strength of the composite formed by injection molding is raised further, because crystallization rate at urgent cooling is restrained so that resin penetrates more easily into the ultrafine concaves on the surface of the aluminum alloy. On the other hand, in new NMT in which aluminum alloy is used (Patent Document 3), only surface configuration of dual irregularities according to the above conditions (1) and (2) are defined for surface configuration on the side of aluminum alloy and there is no condition for chemical adsorption of amine molecules. Due to this, decrease in joining strength of the composite formed by injection molding could not be avoided compared with NMT depending on the absence of chemical adsorption of amine molecules.

PRIOR ART DOCUMENTS

Patent Document

Patent Document 1: WO2004/041532
Patent Document 2: WO2012/070654
Patent Document 3: JP Patent Publication No. 2010-64496
Patent Document 4: WO2008/081933
Patent Document 5: WO2008/078714

DISCLOSURE OF THE INVENTION

Problems to be Solved by the Invention

As explained above, NMT and NMT 2 seemed to be superior to new NMT in respect of joining strength of composites formed by injection molding. However, the present inventors thought it to be necessary to develop further the advantageous result of new NMT, because such a problem as follows is found in the field of actual manufacturing.

Problem: Decrease of Joining Strength According to Days of Storage

In manufacturing process of composites by joining aluminum alloy with resin composition by injection molding according to NMT or NMT 2, there may be an occasion where a time (day) lag occurs from completion of surface treatment step of aluminum alloy until beginning of the next step of joining by injection molding. For example, this may occur when there is a long distance from a factory for chemical conversion treatment, where surface treatment is performed, to a factory for joining by injection molding, where joining by injection molding is performed, so that a long time is required for transportation. Further, it may also be a cause for the time lag that a longer time is required for the step of joining by injection molding than the step of surface treatment, because of setup, etc. There may be a case where it takes a length of time (referred to "days of storage" below) of several days to one or two weeks to transport the aluminum alloy having the step of surface treatment completed and begin the next step of joining by injection molding.

When the days of storage of the aluminum alloy that has been subjected to the surface treatment step becomes longer, it is natural that amine molecules having been adsorbed gradually depart therefrom and so joining strength by injection molding decreases. In this respect, it is considered for new NMT, in which amine molecules as an adsorbed substance are not used, that there is theoretically no decrease of joining strength over time even if joining by injection molding is performed after a long days have lapsed, provided that the aluminum alloy having been subjected to surface treatment is stored in a circumstance of dry air situation. Supposing that there is no restriction for days of storage in new NMT, it can be said that new NMT is a treatment method more suitable in the site of industrial manufacturing than NMT or NMT 2. A following examination of measuring moisture resistance and heat-resistance has been conducted in order to certify this problem.

After the aluminum alloy having been subjected to treatment by NMT 2 has been stored in a circumstance of dry air for two weeks, joining by injection molding was performed using Sastille (registered trade mark) "SGX120" (produced by Tosoh Corporation: main company in Tokyo, Japan) of a PPS resin as a resin to be injected. A joined composite joined by injection molding of the aluminum alloy with this resin was brought into an ion exchange water set to be in a temperature of 98° C. A commercially available electric pot as a heating-heat retention device for boiling water was used for setting the temperature of 98° C. of the ion exchange water. The joined composite of metal and resin was brought into this electric pot and immersed for 1 to 28 days, after which the composite was taken out and dried with a hot air drier. Shear joining strength between the resin and metal of the dried composite was measured (such method of test will be referred to as "pot wet-heat test" or "pot test" below).

As a result, a shear joining strength of about 40 MPa was obtained, which, with a long days of storage, is a value not inferior compared with a case of a short days of storage. However, moisture resistance and heat resistance of this shear joining strength decreased. Due to this, it was thought that NMT is a technology with restriction as a commercial manufacturing method of parts for moving machines or the like. On the above described background, the present invention attains following objects.

It is an object of the present invention to provide a composite of aluminum alloy and resin that, as a composite joined by injection molding of an aluminum alloy and a PPS resin composition, joining strength of the composite joined by injection molding is not lowered irrespective of days of storage between surface treatment step and joining step by injection molding, and a method for manufacturing the same.

It is another object of the present invention to provide an all-weather type composite of aluminum alloy and resin that, as a composite joined by injection molding of an aluminum alloy and a PPS resin composition, joining strength of the composite is not lowered due to deterioration over time under high humidity, and method for manufacturing the same.

Means for Solving the Problem

The present invention employs following means in order to solve the above described problems.

A composite of aluminum alloy and resin according to the present invention 1, including:

aluminum alloy having surface configuration of threefold irregularities such that rough surface having surface roughness of 10 to 100 μm period is observed with an electron microscope in a magnification of 1000 times, surface having fine irregularities of 1 to 5 μm period based on crystal grain boundary is observed with an electron microscope in a magnification of 10000 times and surface having ultrafine irregularities of 30 to 100 nm period is confirmed with an electron microscope in a magnification of 100000 times, and a resin composition consisting of a total resin part and a filler part, the total resin part containing a polyphenylene sulfide resin as a main component by 70 mass % or more of a resin part, and a modified polyolefin resin as an auxiliary component by 30 mass % or less of the resin part, and further containing a resin of third component having ability for promoting compatibility of the polyphenylene sulfide resin and the modified polyolefin resin, and the filler part of reinforcing fiber being 15 to 30 mass % of an entire resin composition;

wherein the aluminum alloy and the resin composition are directly and integrally joined, a joining strength between two parts of an integrated entity of the aluminum alloy and the resin composition as a molded entity is a high joining strength equal to or greater than 30 MPa for both of shear joining strength and tensile joining strength.

The composite according to the present invention 2 is such that, in the composite of aluminum alloy and resin according to the present invention 1, the surface having ultrafine irregularities is one having porous structure formed by an anodization method.

The composite according to the present invention 3 is such that, in the composite of aluminum alloy and resin according to the present invention 1 or 2, amine molecules are chemically adsorbed onto the surface having ultrafine irregularities.

A method according to the present invention 4 is a method for manufacturing the composite of aluminum alloy and resin according to the present invention 1 or 2, in which the aluminum alloy and resin composition that are integrally joined is performed in a manner such that:

amine molecules are chemically adsorbed onto the surface having ultrafine irregularities formed by chemical treatment, and the aluminum alloy is inserted into a metallic mold for injection molding, after which the resin composition is injected into the metallic mold.

Each element of the above means will be explained specifically below.

(Metal and Surface of Metal)

The metal used in the composite of the present invention is a pure aluminum or an aluminum alloy. Aluminum alloy in the present invention will be referred to as such in a concept including a pure aluminum below. The surface of the aluminum alloy according to the present invention realizes a higher joining strength between this aluminum alloy and resin than with the above NMT treatment, etc. Examples of electronic microscope photographs will be shown specifically concerning Experimental Examples explained later. That is, aluminum alloy articles having been subjected to treatment of NMT, NMT 2, etc., are shown through observation with an electronic microscope. As seen in an electronic microscope photograph in magnification of 1000 times, the surface seems plate-like with little variance. The same surface reveals, in an electronic microscope photograph in a magnification of 10000 times, crystal grain boundary lines depressed like grooves. These grooves are formed by chemical etching for removing dirt attached by acid or basic aqueous solution and it seems that the etching has exhibited stronger action near the crystal grain boundary lines. It is observed with an electronic microscope that the diameter of most of the metal crystals of aluminum alloy is within a range of 1 to 5 μm, the period of irregularities is 1 to 5 μm and surface of smooth roughness with shallow (low) depth (height) can be seen. On the other hand, concaves with 20 to 50 nm diameter seems to cover the entire surface in an electronic microscope photograph in a magnification of 100000 times. What is clear in observation of the surface configuration having such irregularities of "NMT 2" is a surface configuration defined in the above condition of (1) according to NMT theory that has ultrafine irregularities of 20 to 50 nm period observed with a photograph in a magnification of 100000 times. In fact, it is natural that naked eye observation cannot discriminate an aluminum alloy material having been subjected to NMT treating from one having been subjected to NMT 2 treatment at all. There is no visage other than that these treated articles have metallic luster that can be observed to be of aluminum alloy material.

The present inventors continued inferring based on a principle that configuration giving a minimum basic unit for creating joining strength consists in a surface having ultrafine irregularities of 20 to 50 nm period, and came to think of enlarging the area of the surface having ultrafine irregularities as the basic unit by more than several times. That is, it was thought to establish a shaped article that has clearly rough surface having several decades to a hundred μm period in a photograph in a magnification of 1000 times and additionally has surface configuration having irregularities of several μm period in strict clearness in a photograph in a magnification of 10000 times by etching in the part of crystal grain boundary line more deeply. For specific treatment operation, the inventors came to think of preparing several kinds of chemical etching liquid set to have a little thicker acid or basic concentration, forming a rough surface having roughness of several decades to a hundred μm period and along with this clearly forming a rough surface having fine roughness of 1 to 5 μm period utilizing crystal grain boundary for each aluminum alloy by use of combination of the above kinds of chemical etching liquid. Forming a surface having ultrafine irregularities of several decades nm period after this was set to be performed in a conventional manner. It was inferred that, if this is possible, the summed area (the entire area) of the surface having ultrafine irregularities in the area for attachment as the surface area of the metal part increases at least by 10 times.

(Method for Surface Treatment)

Three kinds of the above described articles with surface treatment performed will be explained below.
(1) An article treated with hydrazine hydrate adsorbed by a suitable amount similarly as NMT 2 (referred to as "NMT 7" in the present invention and specific matter will be explained later).
(2) An article treated so as to have a similar surface configuration as described above but have no amine molecules adsorbed thereon (referred to as "NMT 7-Oxy" in the present invention and specific matter will be explained later).
(3) An article treated in a manner in which ultrafine irregularities on the metal surface are formed not by immersing in an aqueous solution of hydrazine hydrate but by anodic oxidation (referred to as "Ano-7" in the present invention and specific matter will be explained later).

These three kinds of articles with surface treatment performed have configuration of threefold irregularities referred to in the present invention. Here, it is natural that the treated article of "Ano-7" has no adsorbed amine molecules.

With joined composites joined by injection molding of aluminum alloys having been subjected to treatment of the above "NMT 7", "NMT 7-Oxy" and "Ano-7" respectively with a resin of Sastille (registered trade mark) "SGX120" (produced by Tosoh Corporation: main company in Tokyo, Japan, referred to "SGX120" below) exhibited shear joining strength of 41 to 42 MPa and tensile joining strength of about 45 MPa for all kinds of aluminum alloy species. In short, by forming a rough surface with roughness and additionally forming precisely a rough surface with micron order roughness, shear joining strength exhibited a value that can be thought to be raised even by a small amount, while being of about 40 MPa as conventionally. The other tensile joining strength was raised clearly. Thus, composites were obtained, in which tensile joining strength is clearly higher than shear joining strength. In other words, with the article having surface treatment according to the present invention performed, the surface area is at least several times of that of the article of NMT 2 treatment, which, as understood, brought about the above result. In yet other words, while shear joining strength does not change much compared with one treated in a conventional manner, even by increase of surface area of metal materials, tensile joining strength is raised when surface area increased. This change was clear even by observation with eyes. That is, all of the articles having been subjected to NMT treatment or NMT treatment have metallic lust but all of the above three kinds of articles having been subjected to treatment according to the present invention have matted surface.

(Estimation of Days of Storage and Situation in Joined Site: Making Restricted Days of Storage of Aluminum Alloys Having been Subjected to Surface Treatment being More than Two Weeks)

A target regarding aluminum alloy having been subjected to surface treatment according to the present invention was set based on a wish such that composites joined by injection molding that have a high joining strength obtained by NMT 2 and have ability of preserving the strength under heat and moisture over a long time can be obtained even if days of storage are extended to two weeks. For this, following two measures 1 and 2 were implemented. The measure 1 is to increase surface area of the aluminum alloy. It was thought that, if surface area for joining can be increased by an amount of, e.g. 10 times of articles subjected to NMT 2 treatment even on the quite same principle of joining by injection molding as in NMT 2, increase of area for joining would give much disadvantageous effect on joining strength even if detachment phenomena of adsorbed amine occurs over time. Further, it was presumed that preservation possibility of moisture resistance and heat-resistance of joining strength can be generated when surface area itself of the surface having ultrafine irregularities is increased remarkably, even if adsorption rate of amine compounds is zero from the first. Regarding this inference, the theoretical hypothesis by the present inventors disclosed in Patent Document 2 will be further explained below.

When a composite joined by injection molding consisting of an aluminum alloy piece having surface configuration entirely covered with ultrafine concaves of 20 to 50 nm diameter, and "SGX120" as PPS resin is placed under circumstance of moisture and heat, water molecules or oxygen molecules penetrate through tiny gaps made up by aluminum alloy and resin open to periphery of the joining face. This joining face is a portion where a metal part and a resin part confront each other and it is supposed that, regarding distance between the metal part and resin part, sites with various distance are arranged in a not periodic manner from zero distance (called for a narrow tiny gap where even water molecules, oxygen molecules or nitrogen molecules cannot pass through) to several nm distance. Water molecules or oxygen molecules penetrate through the gap of several nm open in the joining face and move into a gap room (tiny space) formed in the inner side to increase their number. Such water molecules exhibit chemical behavior similar to that of liquid phase when they are gathered in number of thousands or decades thousands. Al atoms, becoming ions, are dissolved into water aggregated in such a manner and further are changed to be aluminum hydroxide (rust), thus being precipitated on the side of aluminum alloy to be attached there. While natural oxide layer on the surface of aluminum alloy (layer of aluminum oxide) decreases due to dissolution through ionization, it turns finally to this rust.

When aluminum oxide forming a surface of aluminum alloy and metal aluminum atoms behind it are converted to aluminum hydroxide as rust, the volume of the latter is increased from the former. As a result of this, the rust with its volume increased finally fills up the gap room (tiny space), so that the gap disappears. In this, when penetration of water molecules from the side face (the outer peripheral face in the joint site) continues, the rust is further increased and expanded to push up the resin part and generate internal stress, along with which the force due to this internal stress acts to open a gap also in the neighboring site having no gap, thus extending the initial point of rust creation aside (to inner side). Due to this, when joining strength of the composite is measured at early time after it was placed under moisture and heat, the value of joining strength will be lower than the initial value because the amount corresponding to internal stress is cancelled. Then, as the rust continues to fill up neighboring gaps so as to elongate rust line, the rust line is elongated along the periphery of the joining face where water molecules can easily penetrate. All of rust lines on the periphery of the joining face are connected finally to form a peripheral wall. The situation is changed when such peripheral wall is formed. Neither of water molecules nor oxygen molecules penetrate into the central portion of the joining face, because this portion is guarded by the peripheral wall.

Water molecules or oxygen molecules penetrating into the central portion of the joining face after this are restricted to those having been diffused through a thick resin layer, and penetration speed is rather low. Therefore, while the gaps (spaces) in the central portion of the joining face are filled up gradually with rust, water molecules are not supplied in such an amount as to have a power of pushing up the resin part so that no new internal stress is generated.

After a time has lapsed further, internal stress due to rebound from the resin part having remained in the vicinity of the peripheral wall gradually decreases because of creep in the resin part, and the joining strength is apt to return to a situation with internal stress removed. The above inference is based on a result obtained from pot wet-heat test and high temperature-high humidity test at a temperature of 85° C. and a humidity of 85%. That is, with composites joined by injection molding of many aluminum alloys prepared by NMT 2 and "SGX120" as a PPS resin, joining strength is once lowered in lapse of a day, when they are subjected to pot wet-heat test, then joining strength, e.g., shear joining strength, begins to be raised for the initial one of 36 to 40 MPa in lapse of two days, and little change can be seen after lapse of three days. Further, in a case where composites are subjected to high temperature-high humidity test, joining strength is once lowered to a minimum value during lapse of 200 to 1000 hours and then turns to a recovering state towards the initial joining strength, and no change can be seen after lapse of 2000 hours. It is thought that the above inference by the present inventors is correct, for explaining this creature-like change of joining strength.

As further inferred, width of gaps in the peripheral wall may be small, ratio of a portion of high joining strength remaining in the central portion of the joining face is high and the joining strength returns to the initial state after once lowered, in a case where maximum width of gaps in portions opened beforehand is extremely narrow as of several nm level. However, width of gaps in the peripheral wall becomes large and area of a portion high joining strength becomes small relatively, in a case where maximum width of gaps in the opened portions is near to 10 nm. In such a case, although joining strength is inclined to be recovered after once having been lowered over time, it is not recovered to a state of the initial joining strength. Here, it was thought to the present inventors, even in a case of same wide gaps as this, that seeming wall width of the peripheral wall should be reduced if the joining face is one having a surface enlarged by several times and favorable result can be expected regarding moisture resistance and heat resistance. In short, this means that, as gaps between a metal part and a resin part are generally widened in a case of no chemical adsorption of amine molecules, property of moisture resistance and heat resistance of joining strength can be obtained in such a case by making surface area several times of the initial value. This means the measure 1.

(Attachment of Amine Molecules to Metal Surface)

In the next, the measure 2 is a method of changing kinds of adsorbed amine compounds in NMT 2. Hydrazine hydrate has been conventionally used as the amine compounds. This is based on a consideration such that, if elongation of days of storage causes physical property of a composite joined by injection molding to be degraded, hydrazine hydrate should be replaced by amine molecules, as material to be adsorbed, having a larger weight and a higher boiling point than the former. In short, this is a method of surface treatment based on a presumption such that the problem will be solved by making detachment speed of amine molecules slower. Specifically used was triethanolamine. While hydrazine hydrate is adsorbed to an article treated by NMT 7 (specific matters will be explained later), surface configuration of an article treated by NMT 8 (specific matters will be explained later) is almost same as one by NMT 7, in addition to which adsorbed substance is replaced by triethanolamine. In short, treatment method by "NMT 8", as referred to in the present invention, was developed.

While it will be explained in detail later, all of metal surfaces of treated articles by NMT 7, NMT 7-Oxy, Ano-7 and NMT 8 respectively were matted surfaces (of pear grounds) in observation by eyes. A composite having matted surface is not favorable in its visage from a commercial viewpoint. This matted surface was a surface of aluminum alloy that had metallic luster in conventional "NMT 2" but was changed to matted surface. While the present inventors had taken it in consideration basically to apply composites according to the present invention to mainly constituting parts for moving machines as automobiles, it is necessary to paint PPS resin parts apt to be damaged by sun rays corresponding to applied machines and also, for aluminum alloy materials having been subjected to surface treatment applied to machines exposed to wind or rain, it is necessary to paint the surface. Corresponding to sites of application, exposed portions of aluminum alloy itself cannot be preserved without coating them with high molecular oil agent such as an anti-rust oil, even if they are not painted. Therefore, the present inventors thought that, if these parts are painted or coated with oils, they have nothing to do with visage of metallic luster or matted surface.

However, regarding composites applied to machines, infrastructures, etc., used or established in outdoor circumstances, those with the aluminum alloy having matted surface cannot be used as commercial articles in viewpoint of design. That is, there are commercial articles, for which only aluminum alloys having metallic luster can be dealt with. Even in such application, in a case where moisture resistance and heat resistance test of composites is allowed to be high temperature-high humidity test with not so strict requirement as at a temperature of 50° C. and a humidity of 90° C. or so, desired joining strength can be maintained even for days of storage of two weeks. Further, obtaining a composite having most excellent moisture resistance and heat resistance in a level of NMT 7 is attained by removing outer visible layer of the aluminum alloy of the composite joined by injection molding through polishing or grinding to remove matted surface, making it a commercial article.

(Conclusion: Measures 1 and 2 for Problems)

The measures 1 and 2 for the above degrading of joining strength due to days of storage (a problem) and matted surface (pear grounds) will be explained. As explained above, success was done as measure 1 that the surface results to be of matted one by adding rough surface having roughness of several decades to a hundred μm period, and initial object is said to be attained with NMT 7, NMT 7-Oxy and Ano-7, if the object remains to be only in making joining strength higher. Here, converting the surface of metal part into matted one performed in the measure for problems, in another words, result in increasing the surface area in the joining surface by a large amount, which means a same matter as increase of surface area. Therefore, the measure for problems is said to have been already attained with "NMT 5", "NMT 5-Oxy" and "Ano-5" the present inventors proposed, although it is not explained here as it does not provide gist of the present invention. That is, the result will be understood by storing these articles with surface treated for two weeks, forming composites using these and measuring moisture resistance and heat resistance thereof. As this is described in the results of tests in Experimental Examples, favorable result is obtained for every aluminum alloy advantageously.

While the other measure 2 is not necessary to be implemented as the result of the measure 1 was best, it was implemented considering that, even though, a new advantage by amine molecules must be added. This is a treatment method of "NMT 8" (specific matters will be explained later), and the result of test performed after storing for two weeks was favorable. The reason why the present inventors left "NMT 8" to the present invention is as follows. That is, chemical etching of immersing in aqueous solutions of hydrochloric acid, sulfuric acid and caustic soda performed for forming a surface with roughness of several decades to a hundred μm, the roughest surface formed in "NMT 7" to "NMT 8", which can be confirmed with an electron microscope of a magnification of 1000 times is a little strengthened, specifically speaking, resulting in a situation such that foams of hydrogen is generated abundantly in the agent bath, thus providing foamy state. When aluminum alloy pieces to be immersed are of a small one with weight of several g, immersion of large number of pieces contained in a jig or jigs creates no problem if the liquid agent is stirred forcibly or so. However, in a case where several masses of aluminum alloy each with weight of about 1 kg contained in a jig or jigs are immersed and violent foaming state is generated, although the lower portion is sufficiently treated, there is a possibility that the upper portion may not make sufficient contact with liquid agent and result of treatment does not come to an aimed level. As such, considering that there is a case where joining strength by injection molding is sufficient in the lower portion but somewhat inferior in the upper portion, it is decided that "NMT 8" serves as a complementary technology for such a case.

Advantage of the Present Invention

With the present invention, days of storage have been made to be more than two weeks for all aluminum alloys by use of "SGX120" as PPS resin, joining strength has been improved compared with a case of NMT 2, and additionally four kinds of treating method "NMT 7", "NMT 7-Oxy", "Ano-7" and "NMT 8" have been obtained, by which moisture resistance and heat resistance are in highest level. Essence of these four kinds of treatment method is in having formed a base material of aluminum alloy having surface configuration of threefold irregularities in which there is clearly rough surface with roughness of 10 to 100 μm period, also there is clearly surface with fine irregularities of 1 to 5 μm period and surface with ultrafine irregularities of 30 to 100 nm period is recognized. Further to say, it is inferred that composition of resin and filler of "SGX120" was very favorable, as a favorable result expected with "SGX120" was realized as it was.

In a case where each of a pure aluminum material and an aluminum alloy is subjected to NMT 2 treatment and inserted into a metallic mold for injection molding and each of various resins for NMT treating is injected into the metallic mold, a composite joined by injection molding with sufficient joining strength can be obtained. In particular, when "SGX120" as PPS resin is used, a composite can be obtained in which not only joining strength is high but also the joining strength maintains moisture resistance and heat resistance for long time. A joined composite of an aluminum alloy and molded thermoplastic resin is of light weight compared with a worked article of steel material. Here, if joining strength of this joined composite has high grade of moisture resistance and het resistance, it will be very useful as a material of parts for moving machines such as automobiles, aircrafts, moving robots, etc. While conventional NMT 2 allows it to be possible, it has problems yet. That is, a most serious problem is that the step of joining by injection molding must be finished before several days lapses after NMT 2 treatment has been performed, in order to completely secure physical property of a joined composite in a highest level such that joining strength has moisture resistance and heat resistance.

On the other hand, when "NMT 7" treatment or so is implemented, joining strength of a composites joined by injection molding using all aluminum alloys and property of moisture resistance and heat resistance of joining strength thereof are not substantially lowered, even if days from performed surface treatment to applied step of joining by injection molding (days of storage) is two weeks. In summary, while limited days of storage for forming a composite joined by injection molding having a high property of joined article were several days in a case of NMT 2, the limited days of storage become two weeks for all aluminum alloys and even more than four weeks corresponding to some kinds of aluminum alloy. As manufacturing of products in a large mass is possible in a commercial base if the days of storage is of about two weeks, the present invention provides an important technology for utilization in manufacturing parts for moving machines.

Advantageous Effect of the Invention

With a composite of aluminum alloy and resin and a method for manufacturing the same, joining strength of the composite joined by injection molding is not lowered irrespective of days of storage from a step of surface treating to a step of joining by injection molding, joining strength is not apt to be lowered over time, and also its moisture resistance and heat resistance are in a high level to cause its joining strength not to be easily lowered.

DETAILED EXPLANATION OF EMBODIMENTS

Figure 1:
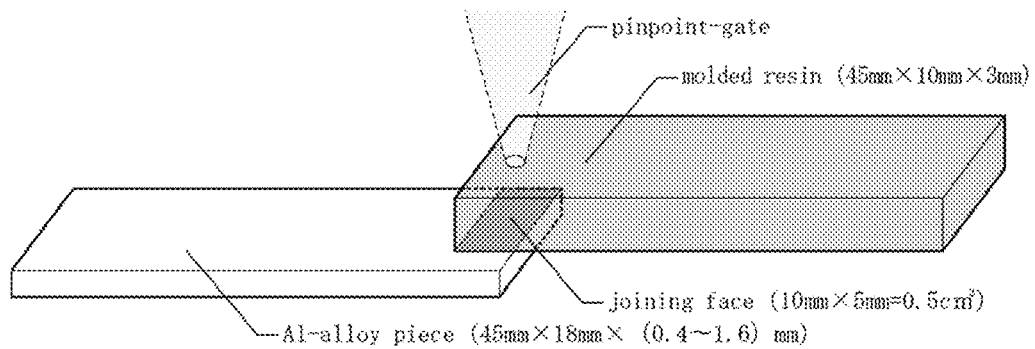
FIG. 1 is a view showing a composite of a metal and resin joined by injection molding as a shaped article (composite) for measuring shear joining strength between the metal part and the molded resin.

Surface treatment methods of pure aluminum and aluminum alloy, methods for forming composites by injection molding using thus treated metal parts and physical property of joined composite, etc., according to the present invention will be specifically explained in details below.

[Aluminum Alloy Materials to be Dealt with]

Aluminum alloy composing a composite of the present invention is thought to be pure aluminum, various aluminum alloys including those as malleable ones or for casting, aluminum plated steel plates, aluminum clad materials or the like.

[Surface Situation]

(Surface Configuration)

Surface configuration required for pure aluminum or aluminum alloys according to the present invention is not limited to that obtained by specific surface treatment methods, but that of aluminum alloy obtained as a result by various surface treatment methods. Further, also aluminum alloys can be used in a case where amine molecules are adsorbed onto their surface. Specifically, the surface provides following (1) or (2).

The surface of an aluminum alloy for composing a composite according to the present invention is (1) one having threefold irregularities such that rough surface having surface roughness of 10 to 100 μm period is observed with an electron microscope in a magnification of 1000 times, surface having fine irregularities of 1 to 5 μm period based on crystal grain boundary is observed with an electron microscope in a magnification of 10000 times and surface having ultrafine irregularities covered with concaves or holes of 30 to 100 nm diameter thereon is confirmed with an electron microscope in a magnification of 100000 times, or (2) one in which either the surface having ultrafine irregularities of the above (1) has no attached amine compounds or molecules thereon, or water soluble amine compounds or molecules such as hydrazine (including hydrazine hydrate), triethanolamine, etc. are adsorbed thereon.

(Specific Surface Treatment Method)

Specific surface treatment method of aluminum alloys composing a composite according to the present invention will be explained generally. As classified by the present inventors, there are four kinds of treatment methods "NMT 7 treatment", "NMT 7-Oxy treatment", "Ano-7 treatment" and "NMT 8 treatment", which will be explained in detail concerning Experimental Examples later. For all of the four methods, the treatment process is divided to a preliminary treatment and a main treatment. The preliminary treatment is a step of forming clearly surface configuration with dual irregularities of rough surface having surface roughness of 10 to 100 μm period and surface having fine irregularities of 1 to 5 μm period based on crystal grain boundary folded thereon. While specific preliminary treatment methods are various for the species of aluminum alloys, a same preliminary treatment method is implemented in a case where the above four kinds of treatment methods are implemented for a species of aluminum alloy. Further, main treatment methods following the preliminary treatment methods are as follows.

With "NMT treatment", the aluminum alloy pieces having been subjected to preliminary treatment are immersed in an aqueous solution of hydrazine hydrate with a concentration of several % for about a minute to form surface having ultrafine irregularities, and then they are immersed in an aqueous solution of hydrazine hydrate with a low concentration less than 1% for several minutes to adsorb hydrazine hydrate (hydrazine) onto the surface of the aluminum alloy pieces. This treatment step is same as in a case of "NMT 2". "NMT-7 Oxy treatment" is a treatment in which the aluminum alloy pieces are immersed in a thin aqueous solution of hydrogen peroxide after having "NMT 7 treatment" finished to break down adsorbed hydrazine, thus resulting in a treatment method causing aluminum alloy pieces to have no adsorbed amine compounds or molecules thereon. "Ano-7 treatment" is a surface treatment method in which a bath for anodization with an aqueous solution of phosphoric acid in concentration of 5 to 10% filled therein is prepared and anodization is performed with an aluminum alloy piece having been subjected to preliminary treatment in the anodic side for about 15 minutes under a voltage of 20 to 25 V. With this anodization, surface having ultrafine irregularities of 30 to 100 nm period is formed, in which entire surface is covered with hole construction having outer openings of 30 to 100 nm diameter. "NMT 8 treatment" is a surface treatment method in which aluminum alloy pieces having been subjected to "Ano-7 treatment" are immersed in a thin aqueous solution of triethanolamine, thus adsorbing trimethanolamine.

(Preliminary Treatment of Surface of Aluminum Alloy)

Specific treatment method in these four kinds of preliminary treatment steps is as follows. At first, aluminum alloys with oil content attached thereon are degreased in a degreasing bath and rinsed with water. This treatment is performed for removing machine oil or oil content attached onto the aluminum alloys during steps of mechanical working, etc., for shaping to have specific forms. In the next, the degreased aluminum alloys are immersed in an aqueous solution of caustic soda having a somewhat thick concentration for a short time to forcibly dissolve natural oxide film or rust, thus making the surface of aluminum alloys clean and activated. In the next, crystal grain boundary is dissolved sufficiently with an aqueous solution of chloric acid and then an aqueous solution of sulfuric acid further digs in deeply there. In the next, the aluminum alloys are immersed in a thin aqueous solution of caustic soda to dissolve aluminum alloy alone in the alloys in a high speed and enlarge height (depth) of rough surface, though restricted to those containing abundant alloy constituency. In the next, pickling of the aluminum alloys is performed in an aqueous solution of nitric acid having a concentration of several % to dissolve and remove smut (insoluble matter) generated in the previous steps, after which the aluminum alloys are rinsed with water. A standard treatment method is as such.

[PPS Resin for Joining by Injection Molding]

Resin composition for joining by injection molding is same as in NMT 2 or NMT 2. Condition of preparation of resin composition is described in the above explained NMT theory or new NMT theory. That is, a resin composition that can be used both in NMT and new NMT is one containing a highly crystalline thermoplastic resin (other than polyolefin resin) as a main component and a resin compatibly soluble with the main component resin as an auxiliary component, or one containing a resin as a third component resin that, even if the auxiliary component resin is not compatibly soluble with the main component resin, promotes compatibility with the main component resin even in part. "SGX120" as a PPS resin for joining by injection molding is a mixed composition of the latter type. That is, a main component in the resin part is PPS, an auxiliary component is a modified polyolefin resin, and a third component resin is added for making the former two kinds of resin compatibly soluble with each other even in part as it is difficult for the two kinds of resins to be compatibly soluble with each other. This third component resin is a composition selected by resin manufacturers and is not an inevitable component for constituting the present invention, but is of a trade secret. So, it is not disclosed in detail here.

Filler mixed in resin for joining by injection molding will be explained. When resin composition as a resin for joining by injection molding is prepared actually, reinforcing fiber such as glass fiber (GF), carbon fiber (CF), etc., and/or inorganic powder such as calcium carbide, talc, etc., are mixed as filler. For example, commercially available "SGX120" used frequently as a PPS resin for joining by injection molding contains GF by 20% added to resin part of 80%. While crystalline thermoplastic resin has a linear expansion coefficient higher than that of amorphous thermoplastic resin, both of these linear expansion coefficients of the resins are far higher than that of metal materials. Due to this, it is necessary to lower the linear expansion coefficient of the resin to a value near that of a metal by additionally mixing GF by 10 to 50%. That is, difference of linear expansion coefficients between the resin part and metal part is very large if content of GF in the resin is in a level of 0 to several %, so that, if a temperature shock with a temperature difference more than 150° C. continues for about 100 cycles, a composite having a joining face area of more than 0.5 cm$^2$ and a thickness of resin part of more than 3 mm will be broken. Adversely, if the resin contains too much GF, it will not be a resin for joining by injection molding in practical use, because joining strength becomes low due to too high melt viscosity in injection and low content rate of resin.

While "SGX120" of PPS resin contains GF by 20%, each constituent in the resin composition including the content of GF gives a very good balance regarding the above linear expansion coefficient, joining strength by injection molding (restraining ability of crystallization at sudden cooling), tensile strength of resin, etc. This is a reason why this resin is frequently used as a PPS resin for joining by injection molding with a metal part. On the other hand, it is preferable to use Sastille (registered trade mark) "SGX115" (produced by Tosoh Corporation: main company in Tokyo, Japan), to say about moisture resistance and heat resistance of joining strength in a composite joined by injection molding with aluminum alloy. With "SGX115", content of GF is 15% and resin portion is 85%. Due to this, "SGX115" contains resin portion more than "SGX120", and hence modified polyolefin resin is contained more, so that the resin not only has a high restraining ability of crystallization at urgent cooling, but also has a low water absorption rate. Thus, the low water absorption rate lowers diffusion rate of water molecules in the resin, resulting in improvement of moisture resistance and heat resistance of joining strength. Here, tensile strength of the resin itself is lower than that of "SGX120" by 15% due to decrease of contained GF, so that shear joining strength of a composite with an aluminum alloy having been subjected to NMT treatment joined by injection molding is 34 MPa.

In a case where "SGX115" as a PPS resin is used alone as a resin composing a composite according to the present invention, joining strength itself of the composite becomes too low. So the present inventors recommends a blended resin of "SGX120" and "SGX115" in a ratio of 1:1. That is, in a case where it is decided that a resin can be fully used even though not providing a highest level of joining strength and further a highest emphasis is put on moisture resistance and heat resistance of joining strength in the present invention, use of this blended resin in a ratio of 1:1 (content of GF is 17.5%) is recommended. However, the present inventors understand that a blended resin containing GF by 20% is of a supreme composition, because rather having a high joining strength provides actually most effective arms for preventing an accident. Therefore, a direction for further improvement in manufacturing composites for use in moving machines will be in raising performance of "SGX120" further, that is, in what a mixed ratio for a mixture of GF and CF (carbon fiber) to employ. This will be variable depending on what a position the used composite is disposed at for use in the moving machine, and is of a study to be made after the present invention is practically realized. So, the present inventors remain to say as follows.

There is a possibility of using CF alone as filler, or using mixture of CF with GF, or further using mixture of GF with inorganic powder. While ordinary role of filler is to raise strength of resin, more important role in the present invention is in lowering linear expansion coefficient of the resin. Consequently, it is preferable that content of filler is in a range of 10 to 30%, and especially in a range of 18 to 22% for a filler of GF alone, by the reason described above. On the other hand, the present inventors are interested much in using a mixture of CF and GF as reinforcing fiber for raising strength of resin itself and at the same time also joining strength by injection molding. However, as seen from experiments performed by the present inventors using three kinds of dry blend resins, that is, one containing GF by 20%, one containing CF by 15% and "SGX100" containing no filler, the result was such as in a level remaining in exhibiting only a tiny improvement compared with "SGX120" and such a mixture was not discovered that seems to have a sufficient meaning for use of expensive CF. Tremendous cooperation by manufacturers of resin is necessary to accomplish this and it is thought to be sufficient at present to begin to develop this after the present invention became one of major technologies for moving machines.

[Joining by Injection Molding]

(Process of Joining by Injection Molding)

Figure 2:
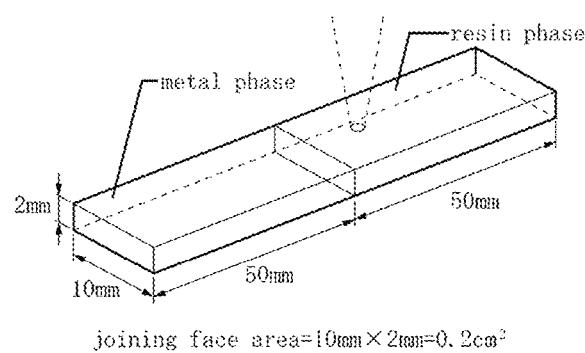
FIG. 2 is a view showing a composite of a metal and resin joined by injection molding as a shaped article (composite) for measuring tensile joining strength between the metal part and the molded resin.

The method for manufacturing a composite according to the present invention is a general purpose method for joining by injection molding. A most suitable condition can be actually obtained by try and error and minor adjustment of conditions of joining by injection molding for obtaining composites joined by injection molding having various shapes. While, generally speaking, temperature at injection and speed of injection are substantially same as in a case of usual injection molding of PPS, it is preferable to set temperature at injection and temperature of a metallic mold to be a little higher. That is, it is preferable that temperature at injection is 300 to 310° C. and temperature of a metallic mold is near to 140° C. Further, in a case where a large type of aluminum alloy with a weight of 1 kg or so is used, injection is performed after waiting at least about one minute from the time when the metallic mold has been closed with the aluminum alloy inserted there. Further, it is preferable to perform injection molding as in said process after preheating in a temperature of 60 to 80° C. before inserting the aluminum alloy into the metallic mold. With these operation, temperature of surface of aluminum alloy becomes near to the temperature of the metallic mold at the time when resin is injected, which, even in a case of a large type of aluminum alloy, provides at once setting of condition near to one in a case where a small type of aluminum alloy is inserted into the metallic mold to form a small type of composite joined by injection molding as shown in FIG. 1 or FIG. 2.

In practice, what is to be corrected after having performed mass production trial before manufacturing composites joined by injection molding is not to be directed to setting of condition for a purpose of forming precisely shaped resin articles to be obtained that has no thin burr, but to be directed to adjustment of condition of injection molding towards hard push-in in an extent as making some thin burr. That is, such an adjustment is necessary for a metallic mold for injection molding in which flow paths necessarily have gas drainages provided and gas draining pins are provided in weld generating sites in the cavity so as not to create such a situation that a metal piece inserted into the cavity is crushed when the metallic mold has been closed to block the gas drainage paths.

(Necessity of Annealing)

The formed composite according to the present invention is preferably subjected to "annealing" treatment by placing it in a hot air drier adjusted to a temperature of about 170° C. to be heated there for about one hour in the same day. The essence of performing annealing treatment consists in that, although the formed composite joined by injection molding is one integrated with a high joining strength, resin part shrinks by some extent in mold shrinkage during a course of cooling to a room temperature after demolding. Shrinkage rate by mold shrinkage is taken to be about 1% for crystalline resin such as PPS resin or the like and about 0.5% for amorphous resin such as ABS resin, and these are most important values for designing a metallic mold. Here, in a case where "SGX120" as a resin is used as in the present invention, the mold shrinkage rate of the resin is about 0.5%, because this resin contains GF by 20%. On the other hand, shrinkage rate of a metal piece is 0.28% as a product of linear expansion coefficient ($2.3 \times 10^{-5}$° $C.^{-1}$) with temperature difference, provided that temperature of the metal piece is lowered from the temperature of the metallic mold to a room temperature and this lowered temperature is taken to be 120° C. in a case of the temperature of the metallic mold of 140° C. As seen in this comparison of shrinkage rates, resin part shrinks clearly in a larger extent, thus generating a high inner stress in the joining face of the formed composite joined by injection molding. Actually, when shear joining strength of a composite formed to have a shape as shown in FIG. 1 is measured in a case of a composite joined by injection molding of "SGX120" with aluminum alloy having been subjected to NMT 2 treatment, shear joining strength is no more than about 30 MPa for a composite before annealing and about 40 MPa for a composite having been subjected to annealing by cooling. This results in that, for a shaped article shown in FIG. 1, the difference between joining strength and remaining stress in an adverse direction corresponds substantially to 10 MPa.

Annealing treatment of a composite according to the present invention is performed in order to this remaining stress once to be removed. For a composite taken out of the hot air drier after annealing, crystallization in resin part has been sufficiently proceeding (molding shrinkage in resin part has ended) and after this both of the aluminum alloy material and resin material shrink only corresponding to their linear expansion coefficients, even under cooling. Due to this, stress remaining in the joining face after cooling is far lower than before cooling. Both of shear joining strength and tensile joining strength are sufficiently high as of 40 MPa or more in the present invention. Consequently, when a commercialized composite is placed in a circumstance of ordinary temperature for an extremely long time, creep proceeds in resin part by the high joining strength, which results in lowering tiny amount of remaining stress having been generated by cooling after annealing and difference between linear expansion coefficients substantially to be removed.

(Temperature Shock Cycle Test)

To say more precisely, in a composite joined by injection molding according to the present invention that has been subjected to annealing treatment, creep in the resin part proceeds during several weeks or several months after the composite has been formed and the composite is exposed to intense temperature shock even after inner stress has been completely removed to be nearly zero. Due to this temperature shock, inner stress may occur instantly according to difference between linear expansion coefficients of aluminum alloy and PPS resin in a case of application to moving machines, etc. As a consequence, such a situation is expected to occur that peeling of resin is generated in a case of a thick resin part even if its joining face area is narrow as of 0.5 cm² or generated from outer peripheral portion in a case of a large type of article having a joining face area of several cm² to several decades of cm², and the situation can naturally occur. Even if such a measure is taken to raise shear joining strength and tensile joining strength to a highest level, this situation will not be solved. There is no other way than coping with the situation by a design method of a composite joined by injection molding under supposition at what a level the highest temperature shock amounts to according to application of the composite, thereby aiming at a complete solving.

EMBODIMENTS

Embodiments of the present invention will be explained in detail and methods for evaluating and measuring composite obtained through the embodiments will be exemplified below.

(a) Observation with an Electron Microscope

An electron microscope was used mainly for observing a surface of a base material. Scanning electron microscopes (SEM) "S-4800 (product name)" (manufactured by Hitachi High-technologies Corporation: main company in Tokyo, Japan) and "JSM-6700F (product name)" (manufactured by Nihon-denshi Co. Ltd.: main company in Tokyo, Japan) were used and observation was performed with 1 to 2 kV.

(b) Measurement of Joining Strength

Figure 3:
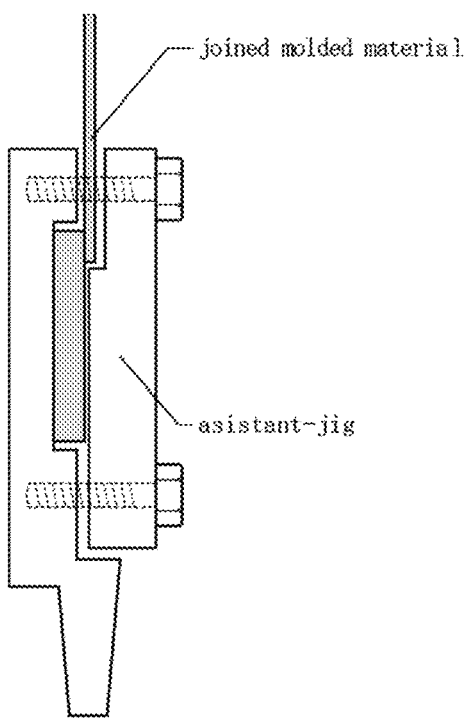
FIG. 3 is a view showing an assistant jig for containing the shaped article shown in FIG. 1 for measuring shear joining strength by placing the article shown in FIG. 1 with the assistant jig in a tensile test machine to create tensile breaking.

In measurement of shear joining strength, breaking force of a composite (shown in FIG. 1) joined by injection molding at tensile breaking on a tensile test machine is called as shear joining strength. In the measurement, an assistant jig shown in FIG. 3 was used. Further, in measurement of tensile joining strength, breaking force of a composite (shown in FIG. 2) joined by injection molding at tensile breaking on a tensile test machine is called as tensile joining strength. "AG-500N/1 kN" (manufactured by Shimadzu-seisakusho Co. Ltd.: main company in Kyoto, Japan) was used as a tensile test machine and measurement was performed at a tension speed of 10 mm/min. Joining strength was measured according to ISO19095 in any time.

(c) High Temperature and High Humidity Test

Multitude of composites (shown in FIG. 1) were placed side by side on cardboard in a high temperature and high humidity test machine "IH400" (manufactured by Yamato Scientific Co. Ltd.: main company in Tokyo, Japan) set to be in a circumstance of a temperature of 85° C. and a humidity of 85% and maintained for up to 8000 hours. Composites taken out of the test machine were dried in a hot air drier at 80° C. for 10 hours and further in an ordinary temperature drier for 10 hours, after which shear joining strength of the composites when broken in a tensile test machine was measured.

The present invention will be explained in more detail regarding Experiment Examples 1 to 23 below.

(Experiment Example 1) NMT Treatment of Aluminum Alloy A5052 (Referential Example)

Experiment example 1 is "NMT treatment" referred to in the present invention. Multitude of rectangular pieces of aluminum alloy with a size of 18 mm×45 mm×1.5 mm and ones with a size of 50 mm×10 mm×2 mm were manufactured from commercially available plates of aluminum alloy A5052 through mechanical working. An aqueous solution containing degreaser for aluminum "NA-6" (made by Meltex Co. Ltd.: main company in Tokyo, Japan) by 10% was filled to be at 60° C. in a tank for immersion, in which the above aluminum alloy pieces were immersed for 5 minutes, and after then the pieces were rinsed with tap water (Ota city, Gumma prefecture, Japan). Next, an aqueous solution of hydrochloric acid having a concentration of 1% was made ready to be at 40° C. in another tank, in which the pieces were immersed for 1 minute, and after then the pieces were rinsed with water. Next, an aqueous solution of caustic soda having a concentration of 1.5% was made ready to be at 40° C. in still another tank, in which the pieces were immersed for 1 minute, and after then the pieces were rinsed with water. Next, an aqueous solution of nitric acid having a concentration of 3% was made ready to be at 40° C. in still another tank, in which the pieces were immersed for 3 minutes, and after then the pieces were rinsed with water. Next, an aqueous solution of hydrazine hydrate having a concentration of 3.5% was made ready to be at 60° C. in still another tank, in which the pieces were immersed for 1 minute, and then the pieces were immersed in an aqueous solution of hydrazine hydrate having a concentration of 0.5% at 40° C. made ready in still another tank for 0.5 minute, and after then the pieces were rinsed with water. Then, the aluminum alloy pieces having been subjected to the above treatment were placed in a warm air drier set to be at a temperature of 67° C. for 15 minutes and dried there.

Figure 4:
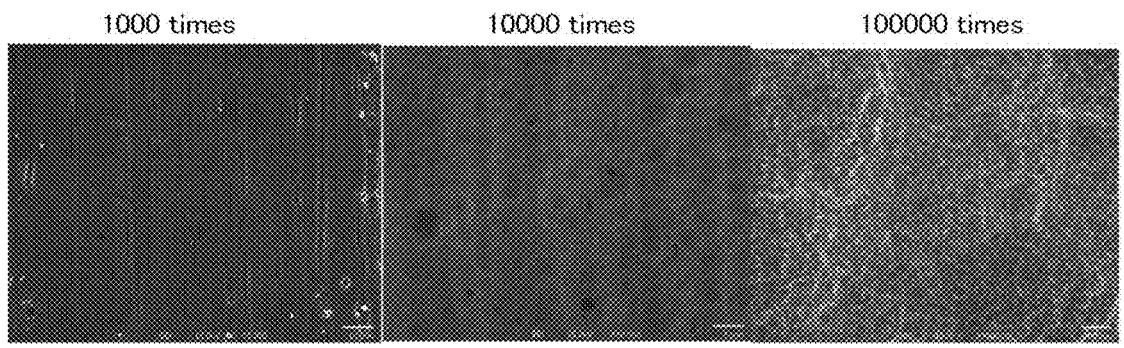
FIG. 4 is an electron microscope photograph of an aluminum alloy A5052 having been subjected to "NMT treatment" in a magnification of 1000 times, 10000 times and 100000 times (Examination Example 1).

FIG. 4 shows electron microscope photographs of aluminum alloy A5052 having been subjected to the above treatment in magnifications of 1000 times, 10000 times and 100000 times respectively. Only a substantially flat surface is observed in a photograph of 1000 times. It is observed in a photograph of 10000 times that there is nearly flat surface configuration where low islands of about 1 µm diameter seem to float in crystal grain boundary as a boundary of metal crystal grain, that is, there is a surface having shallow irregularities of 1 µm period. In a photograph of 100000 times, existence of specific configuration is observed in which ultrafine concaves of 20 nm diameter covers entirely the above surface configuration. Performing surface analysis by XPS of an aluminum alloy piece A5052 having been subjected to same treatment, it can be recognized that Al atoms in the surface layer up to a depth of 1 to 3 nm that can be analyzed are composed of about 70% of $Al^{+3}$ and about 30% of Al0 and the metal aluminum phase is covered with a thin layer of aluminum oxide with a thickness of about 2 nm (extremely thin natural oxide layer). Nitrogen atoms can be recognized in this natural oxide layer with accumulation analysis in about ten times and recognized that amine molecules (hydrazine hydrate) having been used in ultrafine etching treatment are chemically adsorbed thereto.

(Experiment Example 2) NMT 2 Treatment of Aluminum Alloy A5052 (Referential Example)

Experiment example 2 is "NMT 2 treatment" referred to in the present invention. Multitude of rectangular pieces of aluminum alloy with a size of 18 mm×45 mm×1.5 mm and ones with a size of 50 mm×10 mm×2 mm were manufactured from commercially available plates of aluminum alloy A5052 through mechanical working. An aqueous solution containing degreaser for aluminum "NA-6" by 10% was set to be at 60° C. in a tank for immersion, in which the alloy pieces were immersed for 5 minutes, and after then the pieces were rinsed with tap water (Ota city, Gumma prefecture, Japan). Next, an aqueous solution of hydrochloric acid having a concentration of 1% was made ready to be at 40° C. in another tank, in which the alloy pieces were immersed for 1 minute, and after then the pieces were rinsed with water. Next, an aqueous solution of caustic soda having a concentration of 1.5% was made ready to be at 40° C. in still another tank, in which the pieces were immersed for 4 minutes, and after then the pieces were rinsed with water. Next, an aqueous solution of nitric acid having a concentration of 3% was made ready to be at 40° C. in still another tank, in which the pieces were immersed for 3 minutes, and after then the pieces were rinsed with water. Next, an aqueous solution of hydrazine hydrate having a concentration of 3.5% was made ready to be at 60° C. in still another tank, in which the pieces were immersed for 1 minute, and then the pieces were immersed in an aqueous solution of hydrazine hydrate having a concentration of 0.5% at 33° C. in still another tank for 6 minutes, and after then the pieces were rinsed with water. Then, the pieces dried with warm air at a temperature of 67° C. for 15 minutes, thus articles treated by NMT 2 were obtained.

Figure 5:
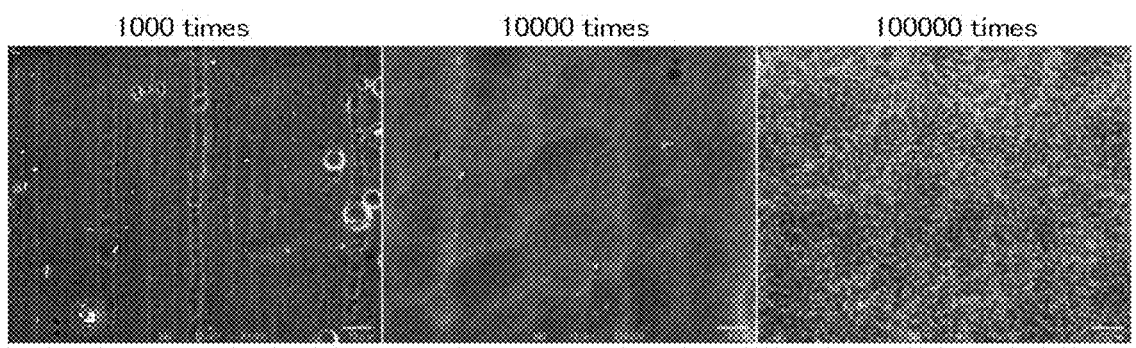
FIG. 5 is an electron microscope photograph of an aluminum alloy A5052 having been subjected to "NMT 2 treatment" in a magnification of 1000 times, 10000 times and 100000 times (Examination Example 2).

FIG. 5 shows electron microscope photographs of aluminum alloy A5052 having been subjected to similar treatment in magnifications of 1000 times, 10000 times and 100000 times respectively. It can be seen that there are nearly flat surface configurations similar to FIG. 4 in the photographs of 1000 times and 10000 times of FIG. 5, and that somewhat more vivid ultrafine concaves of 20 nm diameter covers entire surface in 100000 times of FIG. 5 than in 100000 times of FIG. 4. In short, while surface configuration of the aluminum alloy A5052 piece having been subjected to this treatment is not substantially different from that of Experiment example 1, this is because Experiment example 2 is such that merely chemical adsorption promoting step is added to Experiment example 1. Here, peak of nitrogen atoms is clearly increased in XPS analysis (certification of existence of nitrogen atoms is a result of accumulation analysis, which is not so precise as to digitize quantitative value of adsorption), hence it was thought that chemical adsorption amount is increased.

(Experiment Example 3) NMT 7 Treatment of Aluminum Alloy A5052

Experiment example 3 is "NMT 7 treatment" referred to in the present invention. Multitude of rectangular pieces of aluminum alloy with a size of 18 mm×45 mm×1.5 mm and ones with a size of 50 mm×10 mm×2 mm were manufactured from commercially available plates of aluminum alloy A5052 through mechanical working. An aqueous solution containing degreaser for aluminum "NA-6" by 10% was set to be at 60° C. in a tank for immersion, in which the alloy pieces were immersed for 5 minutes, and after then the pieces were rinsed with tap water (Ota city, Gumma prefecture, Japan). Next, an aqueous solution of caustic soda having a concentration of 10% was made ready to be at 40° C. in another tank, in which the pieces were immersed for 1 minute, and after then the pieces were rinsed with water. Next, an aqueous solution containing hydrochloric acid in a concentration of 5% and aluminum chloride hydrate in a concentration of 1% set to be at 40° C. was made ready still another tank, in which the pieces were immersed for 6 minutes, and after then the pieces were rinsed with water. Next, an aqueous solution containing ammonium-hydrogendifluoride (chemical formula: $(NH_4)HF_2$) in a concentration of 2% and sulfuric acid in a concentration of 10% set to be at 40° C. was made ready still in another tank, in which the pieces were immersed for 4 minute, and after then the pieces were rinsed with water. Next, an aqueous solution of caustic soda having a concentration of 1.5% was made ready to be at 40° C. in still another tank, in which the pieces were immersed for 1 minute, and after then the pieces were rinsed with water. Next, an aqueous solution of nitric acid having a concentration of 3% was made ready to be at 40° C. in still another tank, in which the pieces were immersed for 1.5 minutes, and after then the pieces were rinsed with water.

Figure 6:
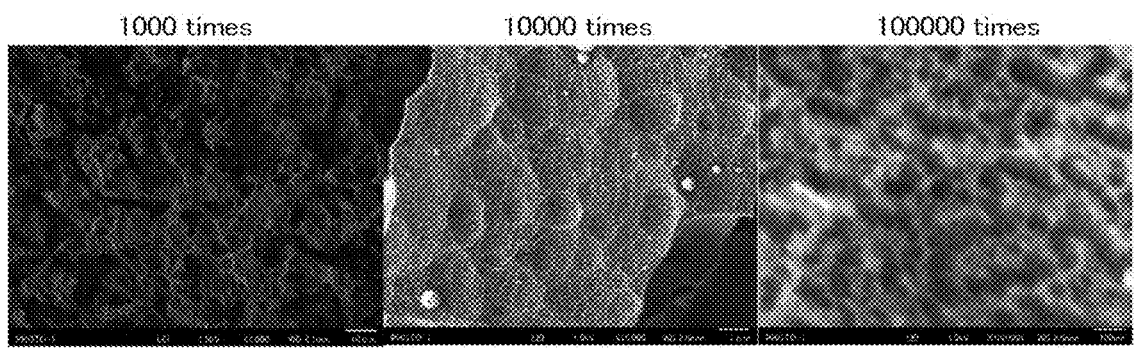
FIG. 6 is an electron microscope photograph of an aluminum alloy A5052 having been subjected to "NMT 7 treatment" in a magnification of 1000 times, 10000 times and 100000 times (Examination Example 3).

Next, an aqueous solution of hydrazine hydrate having a concentration of 3.5% was made ready to be at 60° C. in still another tank, in which the pieces were immersed for 1 minutes, after then the pieces were immersed in an aqueous solution of hydrazine hydrate having a concentration of 0.5% at 33° C. in still another tank for 6 minutes. After then the pieces were rinsed with water. Then, the pieces were placed in a warm air drier set to be at a temperature of 67° C. for 15 minutes and dried. The aluminum alloy pieces A5052 having been subjected to treatment same as the above were observed with an electron microscope. The photograph as a result of observation is shown in FIG. 6, which shows photographs in magnifications of 1000 times, 10000 times and 100000 times respectively. As observed in the photograph of 1000 times of FIG. 6, there is rough surface with a large period containing large protrusions appeared to have mountain-shape with diameter of several decades of μm and surface configuration having irregularities can be seen in the photograph of 10000 times such as to have a period of mountain-shaped protrusions with boundary lines of crystal grain boundary having a size of about 5 μm. In short, this is a surface configuration with a dual irregularities in which a rough face having roughness of several decades of μm period is covered with a face of fine irregularities of several μm period. Also, such a surface configuration is clear in the electron microscope photograph of 100000 times in which ultrafine concaves of 20 to 40 nm diameter covers the entire surface.

Compared with surface configuration in Experiment Examples 1 and 2, the surface configuration by Experiment Example 3 has a clear difference in that a face with roughness of several decades of μm is apparently added in the 1000 times photograph of FIG. 6. Further to say, it can be seen that, in the photograph of 10000 times of FIG. 6, also a surface with roughness of several μm period is made clearer than the surface with roughness by Experiment Examples 1 or 2 and depth (height) of irregularities becomes more intense. Further, the surface of this aluminum alloy having been subjected to NMT 7 treatment is matted one with metallic luster disappearing as seen with eyes.

(Experiment Example 4) NMT 7 Treatment of Aluminum Alloy A7075

Figure 10:
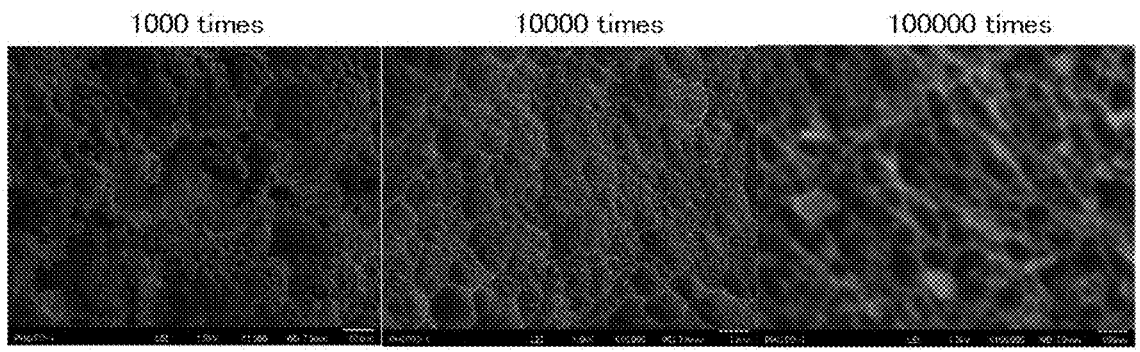
FIG. 10 is an electron microscope photograph of an aluminum alloy A7075 having been subjected to "NMT 7 treatment" in a magnification of 1000 times, 10000 times and 100000 times (Examination Example 4).

Experiment example 4 is "NMT 7 treatment" referred to in the present invention with a base metal material different from that of Experiment Example 3. Multitude of rectangular pieces of aluminum alloy with a size of 18 mm×45 mm×1.5 mm were manufactured from commercially available plates of aluminum alloy A7075 through mechanical working. An aqueous solution containing degreaser for aluminum "NA-6" by 10% was set to be at 60° C. in a tank for immersion, in which the alloy pieces were immersed for 5 minutes, and after then the pieces were rinsed with tap water (Ota city, Gumma prefecture, Japan). Next, an aqueous solution of caustic soda having a concentration of 10% was made ready to be at 40° C. in another tank, in which the pieces were immersed for 1 minute, and after then the pieces were rinsed with water. Next, an aqueous solution containing hydrochloric acid in a concentration of 5% and aluminum chloride hydrate in a concentration of 1% set to be at 40° C. was made ready still another tank, in which the pieces were immersed for 2 minutes, and after then the pieces were rinsed with water. Next, an aqueous solution containing ammonium-hydrogendifluoride in a concentration of 2% and sulfuric acid in a concentration of 10% set to be at 40° C. was made ready still in another tank, in which the pieces were immersed for 1 minute, and after then the pieces were rinsed with water. Next, an aqueous solution of caustic soda having a concentration of 1.5% was made ready to be at 40° C. in still another tank, in which the pieces were immersed for 2 minutes, and after then the pieces were rinsed with water. Next, an aqueous solution of nitric acid having a concentration of 3% was made ready to be at 40° C. in still another tank, in which the pieces were immersed for 1 minute, and after then the pieces were rinsed with water. Next, an aqueous solution of hydrazine hydrate having a concentration of 3.5% was made ready to be at 60° C. in still another tank, in which the pieces were immersed for 1 minute, after then the pieces were immersed in an aqueous solution of hydrazine hydrate having a concentration of 0.5% at 33° C. in still another tank for 2.5 minutes. After then the pieces were rinsed with water. Then, the pieces were placed in a warm air drier set to be at a temperature of 67° C. for 15 minutes and dried. The aluminum alloy pieces A7075 having been subjected to this treatment were observed with an electron microscope. The photograph as a result of observation is shown in FIG. 10, which shows photographs in magnifications of 1000 times, 10000 times and 100000 times respectively.

(Experiment Example 5) NMT 7 Treatment of Aluminum Alloy A6063

Experiment example 5 is "NMT 7 treatment" referred to in the present invention with a base metal material different from that of Experiment Examples 3 and 4. Multitude of rectangular pieces of aluminum alloy with a size of 18 mm×45 mm×1.5 mm were manufactured from commercially available plates of aluminum alloy A6063 through mechanical working. An aqueous solution containing degreaser for aluminum "NA-6" by 10% was set to be at 60° C. in a tank for immersion, in which the alloy pieces were immersed for 5 minutes, and after then the pieces were rinsed with tap water (Ota city, Gumma prefecture, Japan). Next, an aqueous solution of caustic soda having a concentration of 10% was made ready to be at 40° C. in another tank, in which the pieces were immersed for 1 minute, and after then the pieces were rinsed with water. Next, an aqueous solution containing hydrochloric acid in a concentration of 5% and aluminum chloride hydrate in a concentration of 1% set to be at 40° C. was made ready still another tank, in which the pieces were immersed for 8 minutes, and after then the pieces were rinsed with water. Next, an aqueous solution containing ammonium-hydrogendifluoride in a concentration of 2% and sulfuric acid in a concentration of 10% set to be at 40° C. was made ready still in another tank, in which the pieces were immersed for 4 minutes, and after then the pieces were rinsed with water.

Figure 11:
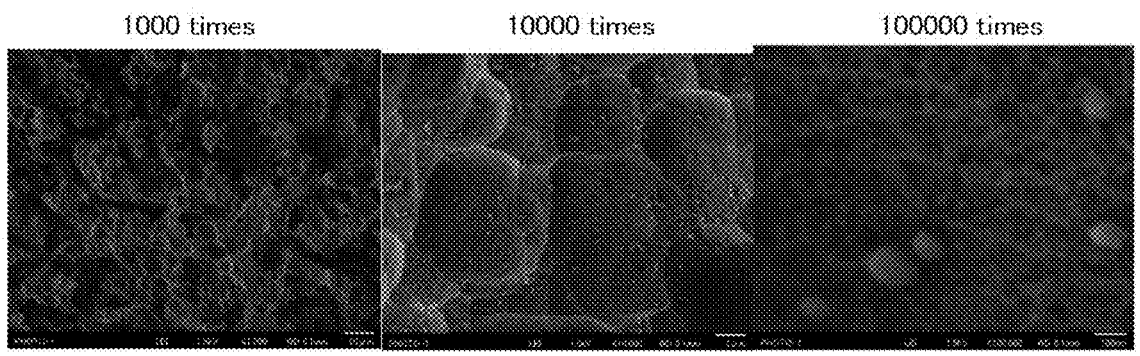
FIG. 11 is an electron microscope photograph of an aluminum alloy A6063 having been subjected to "NMT 7 treatment" in a magnification of 1000 times, 10000 times and 100000 times (Examination Example 5).

Next, an aqueous solution of caustic soda having a concentration of 1.5% was made ready to be at 40° C. in still another tank, in which the pieces were immersed for 1 minute, and after then the pieces were rinsed with water. Next, an aqueous solution of nitric acid having a concentration of 3% was made ready to be at 40° C. in still another tank, in which the pieces were immersed for 2 minutes, and after then the pieces were rinsed with water. Next, an aqueous solution of hydrazine hydrate having a concentration of 3.5% was made ready to be at 60° C. in still another tank, in which the pieces were immersed for 1 minute, after then the pieces were immersed in an aqueous solution of hydrazine hydrate having a concentration of 0.5% at 33° C. in still another tank for 2.5 minutes. After then the pieces were rinsed with water. Then, the pieces were placed in a warm air drier set to be at a temperature of 67° C. for 15 minutes and dried. The aluminum alloy pieces A6063 having been subjected to the above treatment were observed with an electron microscope. The photograph as a result of observation is shown in FIG. 11, which shows photographs in magnifications of 1000 times, 10000 times and 100000 times respectively.

(Experiment Example 6) NMT 7 Treatment of Aluminum Alloy A1100

Experiment example 6 is "NMT 7 treatment" referred to in the present invention. Multitude of rectangular pieces of aluminum alloy with a size of 18 mm×45 mm×1.5 mm were manufactured from commercially available plates of aluminum alloy A1100 through mechanical working. An aqueous solution containing degreaser for aluminum "NA-6" by 10% was set to be at 60° C. in a tank for immersion, in which the alloy pieces were immersed for 5 minutes, and after then the pieces were rinsed with tap water (Ota city, Gumma prefecture, Japan). Next, an aqueous solution of caustic soda having a concentration of 10% was made ready to be at 40° C. in another tank, in which the pieces were immersed for 1 minute, and after then the pieces were rinsed with water. Next, an aqueous solution containing hydrochloric acid in a concentration of 5% and aluminum chloride hydrate in a concentration of 1% set to be at 40° C. was made ready still another tank, in which the pieces were immersed for 10 minutes, and after then the pieces were rinsed with water. Next, an aqueous solution containing hydrochloric acid in a concentration of 5% and aluminum chloride hydrate in a concentration of 1% set to be at 40° C. was made ready still another tank, in which the pieces were immersed for 1 minute, and after then the pieces were rinsed with water.

Figure 14:
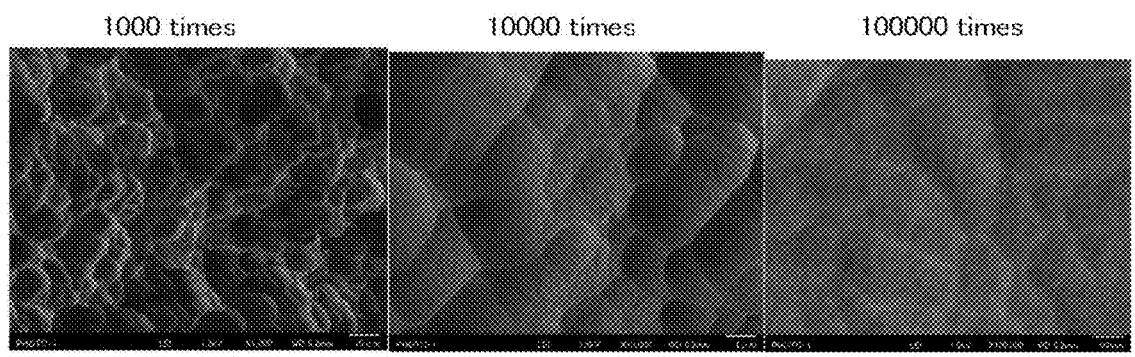
FIG. 14 is an electron microscope photograph of an aluminum alloy A1100 having been subjected to "NMT 7 treatment" in a magnification of 1000 times, 10000 times and 100000 times (Examination Example 6).

Next, an aqueous solution of caustic soda having a concentration of 1.5% was made ready to be at 40° C. in still another tank, in which the pieces were immersed for 2 minutes, and after then the pieces were rinsed with water. Next, an aqueous solution of nitric acid having a concentration of 3% was made ready to be at 40° C. in still another tank, in which the pieces were immersed for 2 minutes, and after then the pieces were rinsed with water. Next, an aqueous solution of hydrazine hydrate having a concentration of 3.5% was made ready to be at 60° C. in still another tank, in which the pieces were immersed for 1 minute, after then the pieces were immersed in an aqueous solution of hydrazine hydrate having a concentration of 0.5% at 33° C. in still another tank for 4 minutes. After then the pieces were rinsed with water. Then, the pieces were placed in a warm air drier set to be at a temperature of 67° C. for 15 minutes and dried. The aluminum alloy pieces A1100 having been subjected to the above treatment were observed with an electron microscope. The photograph as a result of observation is shown in FIG. 14, which shows photographs in magnifications of 1000 times, 10000 times and 100000 times respectively.

(Experiment Example 7) NMT 7 Treatment of Aluminum Alloy A6061

Figure 13:
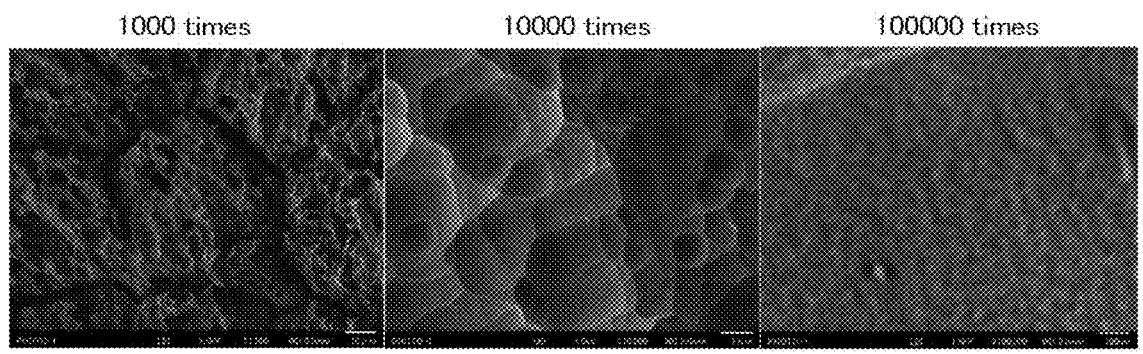
FIG. 13 is an electron microscope photograph of an aluminum alloy A6061 having been subjected to "NMT 7 treatment" in a magnification of 1000 times, 10000 times and 100000 times (Examination Example 7).

Experiment example 7 is "NMT 7 treatment" referred to in the present invention with a base metal material different from that of Experiment Example 6. Multitude of rectangular pieces of aluminum alloy with a size of 18 mm×45 mm×1.5 mm were manufactured from commercially available plates of aluminum alloy A6061 through mechanical working. An aqueous solution containing degreaser for aluminum "NA-6" by 10% was set to be at 60° C. in a tank for immersion, in which the alloy pieces were immersed for 5 minutes, and after then the alloy pieces were rinsed with tap water (Ota city, Gumma prefecture, Japan). Next, an aqueous solution of caustic soda having a concentration of 10% was made ready to be at 40° C. in another tank, in which the alloy pieces were immersed for 1 minute, and after then the pieces were rinsed with water. Next, an aqueous solution containing hydrochloric acid in a concentration of 5% and aluminum chloride hydrate in a concentration of 1% set to be at 40° C. was made ready still another tank, in which the alloy pieces were immersed for 1 minutes, and after then the alloy pieces were rinsed with water. Next, an aqueous solution containing sulfuric acid in a concentration of 10% and ammonium-hydrogendifluoride in a concentration of 2% set to be at 40° C. was made ready still in another tank, in which the alloy pieces were immersed for 1 minute, and after then the pieces were rinsed with water. Next, an aqueous solution of caustic soda having a concentration of 1.5% was made ready to be at 40° C. in still another tank, in which the alloy pieces were immersed for 2 minutes, and after then the pieces were rinsed with water. Next, an aqueous solution of nitric acid having a concentration of 3% was made ready to be at 40° C. in still another tank, in which the alloy pieces were immersed for 1.5 minutes, and after then the alloy pieces were rinsed with water. Next, an aqueous solution of hydrazine hydrate having a concentration of 3.5% was made ready to be at 60° C. in still another tank, in which the pieces were immersed for 1 minute, after then the alloy pieces were immersed in an aqueous solution of hydrazine hydrate having a concentration of 0.5% at 33° C. in still another tank for 4.5 minutes. After then the alloy pieces were rinsed with water. Then, the pieces were placed in a warm air drier set to be at a temperature of 67° C. for 15 to 60 minutes and dried. The aluminum alloy pieces A6061 having been subjected to this treatment were observed with an electron microscope. The photograph as a result of observation is shown in FIG. 13, which shows photographs in magnifications of 1000 times, 10000 times and 100000 times respectively.

(Experiment Example 8) NMT 7 Treatment of Aluminum Alloy A2017

Figure 12:
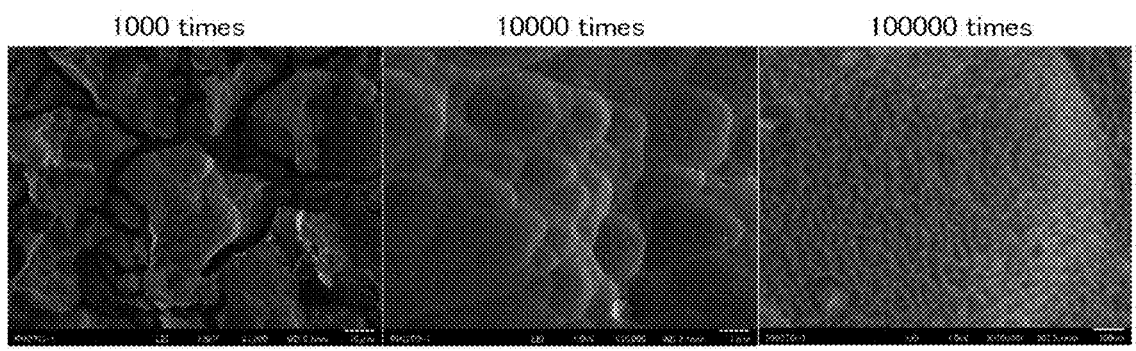
FIG. 12 is an electron microscope photograph of an aluminum alloy A2017 having been subjected to "NMT 7 treatment" in a magnification of 1000 times, 10000 times and 100000 times (Examination Example 8).

Experiment example 8 is "NMT 7 treatment" referred to in the present invention with a base metal material different from that of Experiment Examples 6 and 7. Multitude of rectangular pieces of aluminum alloy with a size of 18 mm×45 mm×1.5 mm were manufactured from commercially available plates of aluminum alloy A2017 through mechanical working. An aqueous solution containing degreaser for aluminum "NA-6" by 10% was set to be at 60° C. in a tank for immersion, in which the aluminum alloy pieces were immersed for 5 minutes, and after then the alloy pieces were rinsed with tap water (Ota city, Gumma prefecture, Japan). Next, an aqueous solution of caustic soda having a concentration of 10% was made ready to be at 40° C. in another tank, in which the aluminum alloy pieces were immersed for 1 minute, and after then the pieces were rinsed with water. Next, an aqueous solution containing hydrochloric acid in a concentration of 5% and aluminum chloride hydrate in a concentration of 1% set to be at 40° C. was made ready still another tank, in which the aluminum alloy pieces were immersed for 1 minute, and after then the alloy pieces were rinsed with water. Next, an aqueous solution containing sulfuric acid in a concentration of 10% and ammonium-hydrogendifluoride in a concentration of 2% set to be at 40° C. was made ready still in another tank, in which the aluminum alloy pieces were immersed for 4 minutes, and after then the pieces were rinsed with water. Next, an aqueous solution of caustic soda having a concentration of 1.5% was made ready to be at 40° C. in still another tank, in which the aluminum alloy pieces were immersed for 2 minutes, and after then the pieces were rinsed with water. Next, an aqueous solution of nitric acid having a concentration of 3% was made ready to be at 40° C. in still another tank, in which the aluminum alloy pieces were immersed for 2.5 minutes, and after then the alloy pieces were rinsed with water. Next, an aqueous solution of hydrazine hydrate having a concentration of 3.5% was made ready to be at 60° C. in still another tank, in which the aluminum alloy pieces were immersed for 1 minute, after then the aluminum alloy pieces were immersed in an aqueous solution of hydrazine hydrate having a concentration of 0.5% at 33° C. in still another tank for 3 minutes. After then the alloy pieces were rinsed with water. Then, the aluminum alloy pieces were placed in a warm air drier set to be at a temperature of 67° C. for 15 to 60 minutes and dried. The aluminum alloy pieces A2017 having been subjected to this treatment were observed with an electron microscope. The photograph as a result of observation is shown in FIG. 12, which shows photographs in magnifications of 1000 times, 10000 times and 100000 times respectively.

(Experiment Example 9) NMT 7 Treatment of Aluminum Alloy ADC12

Experiment example 9 is "NMT 7 treatment" referred to in the present invention with a base metal material different from that of Experiment Examples 6, 7 and 8. Multitude of rectangular pieces made of aluminum alloy ADC12 with a size of 18 mm×45 mm×1.5 mm were manufactured through casting and mechanical working. An aqueous solution containing degreaser for aluminum "NA-6" by 10% was set to be at 60° C. in a tank for immersion, in which the aluminum alloy pieces were immersed for 5 minutes, and after then the pieces were rinsed with tap water (Ota city, Gumma prefecture, Japan). Next, an aqueous solution of caustic soda having a concentration of 10% was made ready to be at 40° C. in another tank, in which the aluminum alloy pieces were immersed for 1 minute, and after then the pieces were rinsed with water. Next, an aqueous solution containing hydrochloric acid in a concentration of 5% and aluminum chloride hydrate in a concentration of 1% set to be at 40° C. was made ready still another tank, in which the alloy pieces were immersed for 4 minutes, and after then the alloy pieces were rinsed with water. Next, an aqueous solution containing ammonium-hydrogendifluoride in a concentration of 2% and sulfuric acid in a concentration of 10% set to be at 40° C. was made ready still in another tank, in which the aluminum alloy pieces were immersed for 1 minute, and after then the pieces were rinsed with water. Next, an aqueous solution of caustic soda having a concentration of 1.5% was made ready to be at 40° C. in still another tank, in which the aluminum alloy pieces were immersed for 4 minutes, and after then the pieces were rinsed with water. Next, an aqueous solution of nitric acid having a concentration of 3% was made ready to be at 40° C. in still another tank, in which the aluminum alloy pieces were immersed for 2 minutes, and after then the pieces were placed in a tank with an ultrasonic transmitter provided for 5 minutes to remove attached smut and then immersed in the tank with the aqueous solution of nitric acid in a concentration of 3.5% at 40° C. contained there for 0.5 minute again, after which the pieces were rinsed with water. Next, an aqueous solution of hydrazine hydrate having a concentration of 3.5% was made ready to be at 60° C. in still another tank, in which the aluminum alloy pieces were immersed for 1 minute, after then the aluminum alloy pieces were immersed in an aqueous solution of hydrazine hydrate having a concentration of 0.5% at 33° C. in still another tank for 1 minute. After then the aluminum alloy pieces were rinsed with water. Then, the pieces were dried at a temperature of 67° C. and for 15 minutes.

(Experiment Example 10) NMT 7-Oxy Treatment of Aluminum Alloy A5052

Figure 7:
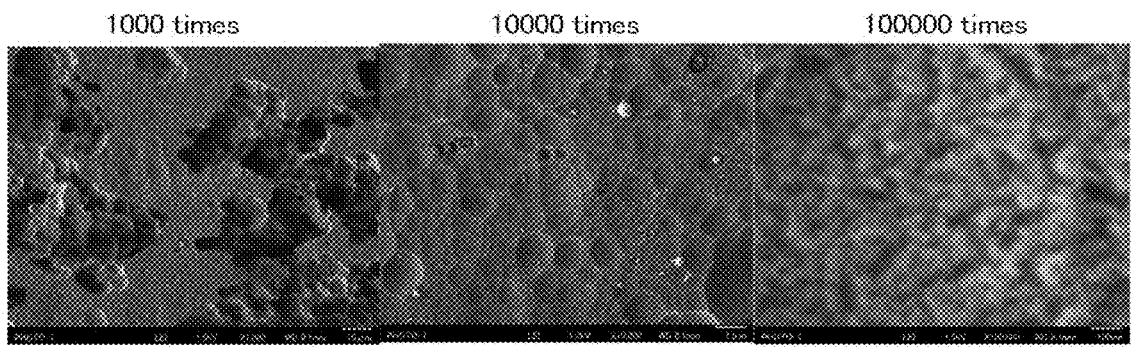
FIG. 7 is an electron microscope photograph of an aluminum alloy A5052 having been subjected to "NMT 7-Oxy treatment" in a magnification of 1000 times, 10000 times and 100000 times (Examination Example 10).

Experiment Example 10 is "NMT 7-Oxy treatment" referred to in the present invention. Multitude of rectangular pieces of aluminum alloy with a size of 18 mm×45 mm×1.5 mm and ones with a size of 50 mm×10 mm×2 mm were manufactured from commercially available plates of aluminum alloy A5052 through mechanical working. After then, quite same operation as Experiment Example 3 (NMT 7 treatment) was performed. Here, the last immersion in a tank with agent was performed by immersing the alloy pieces in an aqueous solution of hydrazine hydrate having a concentration of 0.5% at 33° C. for 6 minutes and after then rinsing the pieces with water to finish treatment by liquid in NMT 7 treatment. Additionally after this, in this Experiment Example, a tank for oxidation was prepared in which an aqueous solution containing hydrogen peroxide in a concentration of 1.5% was made ready and the aluminum alloy pieces were immersed there for 1 minute and then rinsed with water. After then the aluminum alloy pieces were placed in a warm air drier set to be at a temperature of 67° C. for 15 minutes and dried. The aluminum alloy pieces A5052 having been subjected to the treatment were observed with an electron microscope. The photographs as a result of observation are shown in FIG. 7, which show photographs in magnifications of 1000 times, 10000 times and 100000 times respectively. As observed in the photograph of 1000 times of FIG. 7, there is rough surface with a large period containing large protrusions appeared to have mountain-shape with diameter of several decades of μm and surface configuration having irregularities can be seen in the photograph of 10000 times such as to have a period of mountain-shaped protrusions with boundary lines of crystal grain boundary having a size of about 5 μm. In short, this is a surface configuration with a dual irregularities in which a rough face having roughness of several decades of μm period is covered with a face of fine irregularities of several μm period. Also, such a surface configuration is clear in the electron microscope photograph of 100000 times in which ultrafine concaves of 20 to 40 nm diameter covers the entire surface.

(Experiment Example 11) Ano-7 Treatment of Aluminum Alloy A5052

Experiment example 11 is "Ano-7 treatment" referred to in the present invention. Multitude of rectangular pieces of aluminum alloy with a size of 18 mm×45 mm×1.5 mm and ones with a size of 50 mm×10 mm×2 mm were manufactured from commercially available plates of aluminum alloy A5052 through mechanical working. An aqueous solution containing degreaser for aluminum "NA-6" by 10% was set to be at 60° C. in a tank for immersion, in which the aluminum alloy pieces were immersed for 5 minutes, and after then the alloy pieces were rinsed with tap water (Ota city, Gumma prefecture, Japan). Next, an aqueous solution of caustic soda having a concentration of 10% was made ready to be at 40° C. in another tank, in which the aluminum alloy pieces were immersed for 1 minute, and after then the pieces were rinsed with water. Next, an aqueous solution containing hydrochloric acid in a concentration of 5% and aluminum chloride hydrate in a concentration of 1% set to be at 40° C. was made ready still another tank, in which the aluminum alloy pieces were immersed for 6 minutes, and after then the alloy pieces were rinsed with water. Next, an aqueous solution containing ammonium-hydrogendifluoride in a concentration of 2% and sulfuric acid in a concentration of 10% set to be at 40° C. was made ready still in another tank, in which the aluminum alloy pieces were immersed for 4 minutes, and after then the pieces were rinsed with water. Next, an aqueous solution of caustic soda having a concentration of 1.5% was made ready to be at 40° C. in still another tank, in which the aluminum alloy pieces were immersed for 1 minute, and after then the pieces were rinsed with water. Next, an aqueous solution of nitric acid having a concentration of 3% was made ready to be at 40° C. in still another tank, in which the aluminum alloy pieces were immersed for 1.5 minutes, and after then the alloy pieces were rinsed with water. Next, an aqueous solution of ortho-phosphoric acid in a concentration of 8% was made ready to be at 25° C. in still another tank as an anodization bath having a copper rod as a cathode and a titanium plate as an anode, in which the titanium plate is pressed onto the aluminum alloy pieces, and anodized for 15 minutes with an DC power supply "ZX-1600LA" (manufactured by Takasago-seisakusho Co. Ltd.: main company in Kawasaki, Japan) controlled to be at a constant voltage of 25 V. Obtained anodized pieces were rinsed with ion exchange water for about 30 minutes, after then were placed in a warm air drier set to be at 67° C. for 15 minutes and dried and further after then were dried for 15 minutes in a hot air drier set to be at 90° C. After then the pieces were wrapped together with clean aluminum foil, entered into a plastic bag to be sealed and stored.

Figure 8:
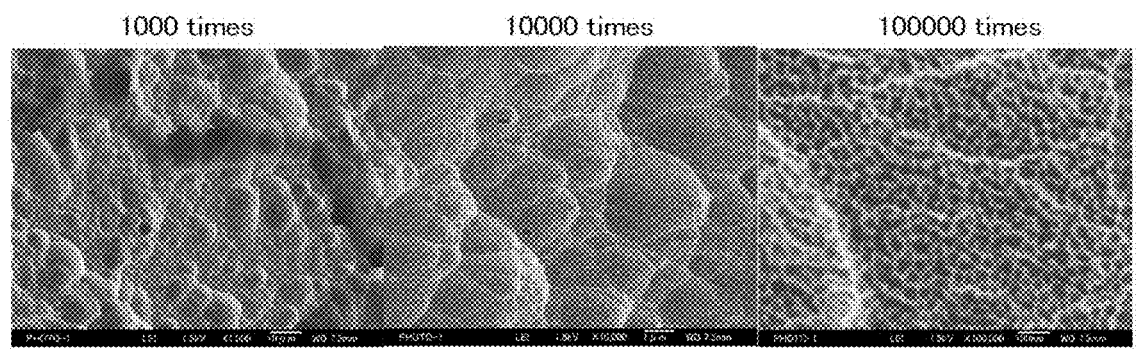
FIG. 8 is an electron microscope photograph of an aluminum alloy A5052 having been subjected to "Ano-7 treatment" in a magnification of 1000 times, 10000 times and 100000 times (Examination Example 11).

One of the aluminum alloy pieces A5052 having been subjected to this treatment was observed with an electron microscope. The photographs as a result of observation are shown in FIG. 8, which show photographs in magnifications of 1000 times, 10000 times and 100000 times respectively. Surface configuration appearing in the photograph of 100000 times is different form one in the photograph of 100000 times shown in FIG. 6 by NMT 7. In a case of an anodized article, ultrafine concaves are rather holes than concaves. Further, the surface is different from an article treated with an aqueous solution of hydrazine hydrate in that the area of holes including periphery thereof appears to be smooth.

(Experiment Example 12) NMT 8 Treatment of Aluminum Alloy A5052

Figure 9:
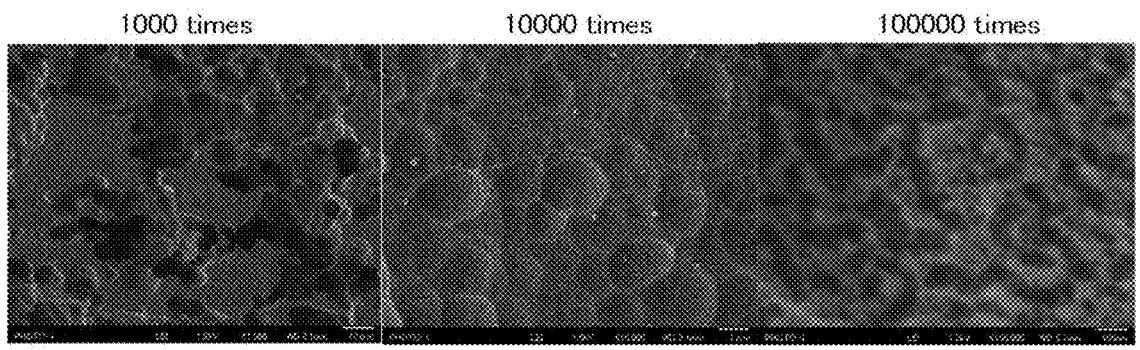
FIG. 9 is an electron microscope photograph of an aluminum alloy A5052 having been subjected to "NMT 8 treatment" in a magnification of 1000 times, 10000 times and 100000 times (Examination Example 12).

Experiment Example 12 is "NMT 8 treatment" referred to in the present invention. Multitude of rectangular pieces of aluminum alloy with a size of 18 mm×45 mm×1.5 mm and ones with a size of 50 mm×10 mm×2 mm were manufactured from commercially available plates of aluminum alloy A5052 through mechanical working. After then, quite same operation of surface treatment as Experiment Example 10 (NMT 7-Oxy treatment) was performed. Here, the last immersion in a tank with agent was performed by immersing the alloy pieces in an aqueous solution containing hydrogen peroxide in a concentration of 1.5% in a tank and after then rinsing the pieces with water to finish treatment by liquid in NMT 7-Oxy treatment. Additionally after this, in this Experiment Example, a tank for promoting adsorption with an aqueous solution containing triethanolamine in a concentration of 0.2% at 40° C. therein was made ready, the aluminum alloy pieces were immersed there for 4 minutes and after then rinsed with water. After this, the aluminum alloy pieces were placed in a warm air drier set to be at 67° C. for 15 minutes and dried. Electron microscope photographs of the aluminum alloy pieces A5052 having been subjected to this treatment are shown in FIG. 9, as photographs in magnifications of 1000 times, 10000 times and 100000 times respectively. The surface configuration is generally not different from one by Experiment Example 5 (NMT 7 treatment) shown in FIG. 6. This is because difference in treatment merely consists in that exchange step of chemical adsorption matter is added to Experiment Example 5 and hydrazine molecules (hydrazine hydrate) as adsorbed molecules are changed to triethanolamine.

(Experiment Example 13) NMT 8 Treatment of Aluminum Alloy A7075

Experiment Example 13 is "NMT 8 treatment" referred to in the present invention. Multitude of rectangular pieces of aluminum alloy with a size of 18 mm×45 mm×1.5 mm were manufactured from commercially available plates of aluminum alloy A7075 through mechanical working. After then, same operation of surface treatment as Experiment Example 4 for NMT 7 treatment of aluminum alloy A7075 was performed. Here, "NMT 8 treatment" does not end with the last step in this NMT 7 treatment such that the pieces are immersed in a tank with an aqueous solution of hydrazine hydrate having a concentration of 0.5% at 33° C. therein for 2.5 minutes and after then rinsed with water. Additionally after this, in this Experiment Example, a tank for oxidation with a hydrogen peroxide in a concentration of 1.5% contained therein was made ready, in which the aluminum alloy pieces were immersed for 1 minute and after then rinsed with water. Further, a tank for promoting adsorption with an aqueous solution containing triethanolamine in a concentration of 0.2% at 40° C. therein was made ready, in which the aluminum alloy pieces were immersed there for 10 minutes and after then rinsed with water. Then, the pieces were placed in a warm air drier set to be at 67° C. for 15 minutes and dried.

(Experiment Example 14) NMT 8 Treatment of Aluminum Alloy A6063

Experiment Example 14 is "NMT 8 treatment" referred to in the present invention with a base metal material different from that of Experiment Example 13. Multitude of rectangular pieces of aluminum alloy with a size of 18 mm×45 mm×1.5 mm were manufactured from commercially available plates of aluminum alloy A6063 through mechanical working. After then, operation of surface treatment by NMT 7 similar to Experiment Example 5 with a same base metal material was performed. Additionally after this, in this Experiment Example, a tank for oxidation with an aqueous solution containing hydrogen peroxide in a concentration of 1.5% therein was prepared, in which the alloy pieces were immersed for 1 minute and after then rinsed with water. Then a tank for promoting adsorption with an aqueous solution containing triethanolamine in a concentration of 0.4% at 40° C. therein was prepared, in which the aluminum alloy pieces were immersed there for 8 minutes and after then rinsed with water. After this, the aluminum alloy pieces were placed in a warm air drier set to be at 67° C. for 15 minutes and dried.

(Experiment Example 15) NMT 8 Treatment of Aluminum Alloy A6061

Experiment Example 15 is "NMT 8 treatment" referred to in the present invention with a base metal material different from that of Experiment Examples 13 and 14. Multitude of rectangular pieces of aluminum alloy with a size of 18 mm×45 mm×1.5 mm were manufactured from commercially available plates of aluminum alloy A6061 through mechanical working. After then, operation of surface treatment by NMT 7 similar to Experiment Example 7 with a same base metal material was performed. Additionally after this, in this Experiment Example, a tank for oxidation with an aqueous solution containing hydrogen peroxide in a concentration of 1.5% therein was prepared, in which the alloy pieces were immersed for 1 minute and after then rinsed with water. Then a tank for promoting adsorption with an aqueous solution containing triethanolamine in a concentration of 0.2% at 40° C. therein was prepared, in which the aluminum alloy pieces were immersed there for 5 minutes and after then rinsed with water. After this, the aluminum alloy pieces were placed in a warm air drier set to be at 67° C. for 15 minutes and dried.

(Experiment Example 16) NMT 8 Treatment of Aluminum Alloy A2017

Experiment Example 16 is "NMT 8 treatment" referred to in the present invention with a base metal material different from that of Experiment Examples 13, 14 and 15. Multitude of rectangular pieces of aluminum alloy with a size of 18 mm×45 mm×1.5 mm were manufactured from commercially available plates of aluminum alloy A2017 through mechanical working. After then, operation of surface treatment by NMT 7 similar to Experiment Example 8 with a same base metal material was performed. Additionally after this, in this Experiment Example, a tank for oxidation with an aqueous solution containing hydrogen peroxide in a concentration of 1.5% therein was prepared, in which the alloy pieces were immersed for 1 minute and after then rinsed with water. Then a tank for promoting adsorption with an aqueous solution containing triethanolamine in a concentration of 0.2% at 40° C. therein was prepared, in which the aluminum alloy pieces were immersed there for 4 minutes and after then rinsed with water. After this, the aluminum alloy pieces were placed in a warm air drier set to be at 67° C. for 15 minutes and dried.

(Experiment Example 17) NMT 8 Treatment of Aluminum Alloy ADC12

Experiment Example 17 is "NMT 8 treatment" referred to in the present invention with a base metal material different from that of Experiment Examples 13, 14, 15 and 16. Multitude of rectangular pieces of aluminum alloy with a size of 18 mm×45 mm×1.5 mm were manufactured from plates of aluminum alloy ADC12 through casting and mechanical working. After then, operation of surface treatment to Experiment Example 9 with a same base metal material was performed. Additionally after this, in this Experiment Example, a tank for oxidation with an aqueous solution containing hydrogen peroxide in a concentration of 1.5% therein was prepared, in which the alloy pieces were immersed for 1 minute and after then rinsed with water. Then the aluminum alloy pieces were placed in a hot air drier set to be at 80° C. for 15 minutes and dried, further after then the pieces were placed in a hot air drier set to be at 100° C. for 15 minutes and subjected to heat processing. Next, the aluminum alloy pieces were immersed in a tank for rinsing with an ultrasonic transmitter provided for 7 minutes to remove attached smut. After then, a tank for promoting adsorption with an aqueous solution containing triethanolamine in a concentration of 0.1% at 40° C. therein was prepared, in which the aluminum alloy pieces were immersed there for 5 minutes and after then rinsed with water. After this, the aluminum alloy pieces were placed in a warm air drier set to be at 67° C. for 15 minutes and dried.

(Experiment Example 18) Joining Strength of Composites Joined by Injection Molding of PPS Resin According to Difference in Days of Storage Experiment Example 18 is an experiment of change in joining strength of composites according to days of storage of base metal materials after their treatment as in Experiment Examples 1 to 17. Each of one kind or two kinds of size of aluminum alloy pieces obtained in Experiment Examples were stored in a manner explained below and, experiment was performed, joining each of aluminum alloy pieces by injection molding for integrating it with resin on the day of treatment, one day later, seven days later, fourteen days later and twenty eight days later. Storage of the aluminum alloy pieces was made in such a manner that each five aluminum alloy pieces was placed side by side on a sheet of OPP (oriented polypropylene) film and another sheet of OPP film was laid thereon to sandwich the aluminum alloy pieces, and then the pieces were stored for the above days. To say the manner of storage more specifically, plastic bags of OPP film were laid on a large cardboard sheet, the above aluminum alloy pieces having been subjected to treatment were entered to be side by side in the bags (so that the aluminum alloy pieces do not overlap on each other), an open portion of each bag is partially closed by adhesive tape laid thereon to attach the bag with the alloy pieces therein on to the cardboard sheet. In short, the aluminum alloy pieces were stored with both upper face and lower face of each of the alloy pieces substantially touch with OPP film, and further in a semi-sealed situation, although circumference around the alloy pieces is atmosphere.

Further, the OPP bags with the aluminum alloy pieces therein were covered with cardboards and stacked on the table in a room of a factory. A large cardboard sheet is laid on the uppermost of the stacked so that sunlight entering through a window does not strike onto the alloy pieces through OPP film. Here, the aluminum alloy pieces contained in several sets of the OPP bags are in a situation such that they are illuminated to some extent through gaps between the cardboards. It was taken care that the aluminum alloy pieces in storage are not illuminated directly by sunlight. The place for storage was not a factory operated all day with air conditioner operated through all day but a common factory (in Ohta city, Gumma prefecture, Japan) with air conditioner in daytime alone.

The aluminum alloy pieces were divided according to days of storage to zero day (on the day of treatment), one day, a week, two weeks and four weeks, respectively. Then each of the aluminum alloy pieces was inserted into a metallic mold for injection molding and "SGX120" as a PPS resin for injection molding was injected, so that a composite joined by injection molding (test piece) as shown in FIG. 1 was obtained. Temperature of injection was set to be at 300° C. and temperature of the metallic mold was set to be at 140° C. The obtained composites joined by injection molding were placed in a hot air drier set to be at 170° C. for an hour to be subjected to annealing. In such a manner, more than ten pieces of composites (test pieces) in a shapes shown in FIG. 1 or 2 for day (days) of storage were obtained. With these test pieces, shear joining strength and tensile joining strength were measured at a temperature of 23° C. In the test of joining strength, an average value of three pairs of test pieces in a same condition was taken as a result of test. The result obtained for test pieces from ones having been joined by injection molding to ones with days of storage of two weeks and four weeks was shown in Table 1 respectively.

TABLE 1

Relation between shear-tensile joining strengths and days of storage with aluminum alloy/SGX120 composites joined by injection molding

| | Species of Al alloy | Surface treatment method | Days of storage (days) | Shear joining strength (MPa) | Tensile joining strength (MPa) |
|---|---|---|---|---|---|
| Experiment Example 1 (referential example) | A5052 | NMT | 0 | 40.8 | 34.0 |
| | | | 1 | 40.5 | 34.2 |
| | | | 7 | 40.8 | 33.1 |
| | | | 14 | 38.2 | 31.5 |
| | | | 28 | 33.8 | 28.2 |
| Experiment Example 2 (referential example) | A5052 | NMT 2 | 0 | 40.5 | 39.7 |
| | | | 14 | 40.3 | 40.0 |
| Experiment Example 3 | A5052 | NMT 7 | 0 | 41.8 | 46.5 |
| | | | 14 | 41.5 | 45.5 |
| Experiment Example 10 | A5052 | NMT 7-Oxy | 0 | 42.0 | 44.3 |
| | | | 14 | 41.5 | 45.5 |
| Experiment Example 11 | A5052 | NMT 7-Oxy | 0 | 41.7 | 45.5 |
| | | | 14 | 41.6 | 45.8 |
| Experiment Example 12 | A5052 | NMT 8 | 0 | 42.1 | 45.8 |
| | | | 14 | 41.8 | 46.9 |

T1 shows an example of A5052, where, for the articles having been subjected to NMT treatment, joining strength with two weeks of storage was somewhat lowered, though joining strength with days of storage up to a week is not changed. Here, with articles having been subjected to NMT 2 treatment, it was conventionally known that joining strength of all species of aluminum alloy with days of storage up to two weeks exhibits substantially same value of about 40 MPa, and the result in shown in Table 1 was similar too. On the other hand, in a case of composites joined by injection molding using mainly aluminum alloy A5052 shown in Table 1 having been subjected to NMT 7 treatment exhibits shear joining strength of 41 to 42 MPa, which is higher than about 40 MPa that was taken as the highest value of shear joining strength by use of "SGX120", though difference is of a mere value as entering within an error range in measurement or in surface treatment steps. Further, tensile joining strength was clearly higher than those by NMT treatment. Here, the values of tensile shear strength shown in Table 1 are average value of pairs of composites and the highest value of tensile joining strength was 48 MPa and the lowest value is 42 MPa for individual pairs of pieces by NMT 7 or NMT 8, which suggests that tensile joining strength will be raised further by adjusting surface treatment method. After all, it is not known yet in which level the value of the highest tensile joining strength by use of "SGX120" is. At least regarding days of storage, tensile joining strength of composites with two weeks of storage is in a similar level as those having been joined by injection molding on the instant day, if surface treatment for forming surface with fine irregularities is in a grade higher than NMT 2 by use of "SGX12000", and joining strength reveals no change.

(Experiment Example 19) Moisture Resistance and Heat Resistance of Joining Strength of Composites Joined by Injection Molding Using PPS Resin (Test by Pot Wet-Heat Test and High Temperature-High Humidity Test (Pot Wet-Heat Test)

With Experiment Example 19, two kinds of result of wet-heat test are shown. Using aluminum alloy pieces in a size of 18 mm×45 mm×1.5 mm dealt with in Experiment Examples 1 to 17, both of composites in a shape shown in FIG. 1 joined by injection molding, with PPS resin "SGX120" used, on the day of surface treatment and of composites in a shape shown in FIG. 1 joined by injection molding, with PPS resin "SGX120" used, on a day after days of storage lapse as shown in Experiment Example 18 were subjected to both of pot wet-heat test at a temperature of 98° C. and of high temperature-high humidity test at a temperature of 85° C. and humidity of 85% respectively. Here, operation of joining by injection molding was performed in such a way that resin is injected at a time when a minute lapsed after the aluminum alloy piece having been subjected to the above surface treatment was inserted into the metallic mold and the mold was closed. The result is shown in Table 2.

TABLE 2

| Shear joining strengths of aluminum alloy/SGX120 composites joined by injection molding before and after wet-heat test (1) | | | | | |
|---|---|---|---|---|---|
| | Spiecies of Al alloy | Surface treatment method | Days of storage (days) | Wet-heat test method | Shear joining strength before or after wet-heat test (MPa) |
| Experiment Example 1 (referential example) | A5052 | NMT | 0 | before test P test of | 40.8 |
| | | | | 1 day | 15.0 |
| | | | | 5 days | 10.0 |
| Experiment Example 2 (referential example) | A5052 | NMT 2 | 0 | before test P test of | 40.5 |
| | | | | 1 day | 35.2 |
| | | | | 5 days | 38.4 |
| | | | | 14 days | 38.6 |
| | | | | 28 days | 38.2 |
| | | | 14 | before test P test of | 40.3 |
| | | | | 1 day | 30.4 |
| | | | | 5 days | 32.3 |
| | | | | 14 days | 31.0 |
| | | | 0 | before test HT-HH test* | 40.5 |
| | | | | 250 h | 35.0 |
| | | | | 1000 h | 38.4 |
| | | | | 3000 h | 38.0 |
| | | | | 6000 h | 38.6 |
| | | | | 8000 h | 38.4 |
| | | | 14 | before test HT-HH test* | 40.3 |
| | | | | 250 h | 32.3 |
| | | | | 1000 h | 29.0 |
| | | | | 3000 h | 23.0 |

| Shear joining strengths of aluminum alloy/SGX120 composites joined by injection molding before and after wet-heat test (2) | | | | | |
|---|---|---|---|---|---|
| | Spiecies of Al alloy | Surface treatment method | Days of storage (days) | Wet-heat test method | Shear joining strength before and after wet-heat test (MPa) |
| Experiment Example 3 | A5052 | NMT 7 | 14 | before test P test of | 41.5 |
| | | | | 5 days | 37.5 |
| | | | | 14 days | 38.0 |
| | | | 14 | before test HT-HH test* | 41.5 |
| | | | | 250 h | 35.0 |
| | | | | 1000 h | 38.1 |

TABLE 2-continued

| Experiment Example 10 | A5052 | NMT7-Oxy | 14 | before test P test of | 41.5 |
| --- | --- | --- | --- | --- | --- |
| | | | | 5 days | 38.5 |
| | | | | 14 days | 38.0 |
| | | | 14 | before test HT-HH test* | 41.5 |
| | | | | 500 h | 37.4 |
| | | | | 1000 h | 38.0 |
| Experiment Example 11 | A5052 | Ano-7 | 14 | before test P test of | 41.6 |
| | | | | 5 days | 38.5 |
| | | | | 14 days | 38.3 |
| | | | 14 | before test HT-HH test* | 41.6 |
| | | | | 500 h | 35.0 |
| | | | | 1000 h | 37.4 |
| Experiment Example 12 | A5052 | NMT 8 | 14 | before test P test of | 41.8 |
| | | | | 5 days | 37.5 |
| | | | | 14 days | 38.8 |
| | | | 14 | before test HT-HH test* | 41.8 |
| | | | | 500 h | 34.3 |
| | | | | 1000 h | 37.0 |

*HT-HH test: high temperture-high humidity test

It can be seen in Table 2 that joining strength of composites joined by injection molding, in which PPS resin "SGX120" is injected onto aluminum alloy A5052 pieces having been subjected to NMT treatment, has no property of moisture resistance and heat resistance. With articles by NMT 2 treatment, it can be seen that composites joined by injection molding within the day after the treatment has high property of moisture resistance and heat resistance and result in a highest level is attained in both of pot wet-heat test and high temperature-high humidity test as accelerated tests for evaluating in what an extent joining strength is lowered in an atmosphere with humidity. That is, a test, in which the composites are immersed in hot water in a temperature of 98° C. for 3 to 28 days, is a very harsh test and seems to correspond to an endurance test in which they are exposed to weather in a district of high temperature and high humidity in the world for 10 years, several decades of years or more than 100 years. Further, it was thought to be a similarly astonishing result that change of joining strength occurs merely in a tiny extent even if they are placed in a temperature of 85° C. and a humidity of 85% for 8000 hours (about 11 months). However, with composites by NMT 2 treatment joined after 14 days of storage, results are lowered in both tests of moisture resistance and heat resistance.

With composites joined by injection molding using articles by NMT 2 treatment, tests were performed by immersing them in a pot for 1 to 14 days (2 weeks) as wet-heat test and by placing them in a high temperature-high humidity test machine for 8000 hours (11 months). It can be seen in the result of both tests that joining strength is once lowered in an early stage of wet-heat test that the composites are subjected to and after then is recovered, and the recovery remains in a change in a range of error after joining strength has been raised to an extent. It can be seen with the pot wet-heat test that joining strength is frequently lowered by immersion for one day, raised by immersion for two days than the previous day, and maintains a constant value after having been raised in three to five days (for ones having high property of moisture resistance and heat resistance).

For composites joined by injection molding with aluminum alloy A5052 by NMT 7 to NMT 8 treatment according to the present invention, high property of moisture resistance and heat resistance was certified by performing pot wet-heat test for two weeks and high temperature-high humidity test for 1000 hours at first. For any of treated articles, there was not so large difference in property of moisture resistance and heat resistance between articles of pot test for 5 days and articles of pot test for 14 days but was a substantially same level of property between them. In contrast to this, result of high temperature-high humidity test was observed such that joining strength was clearly lowered after 500 hours have lapsed and was recovered in 1000 hours. This inclination is same as data of composites joined by injection molding on the instant day after NMT 2 treatment.

In any way, aluminum alloy, with which property of moisture resistance and heat resistance of composites joined by injection molding in a case of two weeks of storage is superior, appears to be limited to one other than articles by NMT treatment and NMT 2, that is, though similar in having surface with ultrafine irregularities of several decades to a hundred nm period, and yet to one that has rough surface of several decades of μm period (matted surface) and added existence of clear fine irregularities of several μm period. Main reason of it, without doubt, consists in that this change in configuration has created a dramatic increase of surface area.

(Experiment Example 20) Moisture Resistance and Heat Resistance of Composites Joined by Injection Molding Using PPS Resin (Pot Wet-Heat Test)

Experiment Example 20 is "pot wet-heat test" referred to in the present invention. While this is test for measuring property of moisture resistance and heat resistance in various treatments of aluminum alloy similar to Experiment Example 19, pot wet-heat test of 5 days, with which not so many days are necessary for test, was performed regarding aluminum alloy A5052 and also alloys other than it here. The result is shown in Table 3.

TABLE 3

Shear joining strengths of various aluminum alloys/SGX120 composites joined by injection molding before and after wet-heat test (2)

|  | Spiecies of Al alloy | Surface treatment method | Days of storage (days) | Shear joining strength before pot test (MPa) | Shear joining strength after pot test of 5 days (MPa) |
|---|---|---|---|---|---|
| Experiment Example 3 | A5052 | NMT 7 | 14 | 41.5 | 37.5 |
| Experiment Example 4 | A7075 | NMT 7 | 14 | 41.3 | 40.0 |
| Experiment Example 5 | A6063 | NMT 7 | 14 | 41.5 | 39.3 |
| Experiment Example 6 | A1100 | NMT 7 | 14 | 41.3 | 38.5 |
| Experiment Example 7 | A6061 | NMT 7 | 14 | 40.8 | 38.8 |
| Experiment Example 8 | A2017 | NMT 7 | 14 | 41.0 | 38.5 |
| Experiment Example 9 | ADC12 | NMT 7 | 14 | 41.2 | 39.5 |
| Experiment Example 10 | A5052 | NMT7-Oxy | 14 | 40.6 | 38.5 |
| Experiment Example 11 | A5052 | Ano-7 | 14 | 41.6 | 38.5 |
| Experiment Example 12 | A5052 | NMT 8 | 14 | 41.8 | 37.5 |

In short, considering from the result of Experiment Example 15, it was thought that result of this pot wet-heat test of 5 days may show joining strength after 1000 hours in high temperature-high humidity test. Thus, measurement was performed including also aluminum alloys other than aluminum alloy A5052. As seen in Table 3, all measured values including variation, not in mean value of several pieces, amounts to 36 MPa or more, values corresponding to 90% or more of the initial joining strength. Hence, the composites were supposed to have property moisture resistance and heat resistance exhibiting shear joining strength of 36 MPa or more even in a case where test was performed by placing the composites in a high temperature-high humidity test machine for 6000 to 8000 hours.

(Experiment Example 21) Moisture Resistance and Heat Resistance of Composites Joined by Injection Molding Using PPS Resin (Test with a High Temperature-High Humidity Test Machine)

Experiment Example 21 is test under wet-heat load by placing in a high temperature-high humidity test machine for a long time. While joining strength of composites after having been placed in a high temperature-high humidity test machine set to be at a temperature of 85° C. and a humidity of 85% for several thousand hours could be supposed with Experiment Example 19, this was certified here. As explained before, a composite of an article treated by NMT 2 joined by injection molding with "SGX120" on the instant day has an extraordinary high joining strength, rather merely high one, and has property of moisture resistance and heat resistance. Considering a reason for this, following situation can be understood clearly. That is, water molecules or oxygen molecules having penetrated into the joining face generate rust of aluminum alloy and generated rust completely fill up narrow gaps that were originally present there, thus causing the joining strength that was once lowered to be directed to recovery again as a creature. This result of high temperature-high humidity test can be more easily understood than pot wet-heat test that is too intense as accelerated test, just because the former is long term accelerated test taking 6000 to 8000 hours.

Result of composites using aluminum alloy A5052 is shown in FIG. 4 and result of composites using other aluminum alloys is shown in FIG. 5. The values of joining strength, shown in FIGS. 4 and 5, after having been placed in a high temperature-high humidity test machine is ones, for which composites joined by injection molding taken out of the test machine is placed in a hot air drier set to be at 80° C. for 10 hours, further placed for 10 hours with the drier switched to blast drying at an ordinary temperature to be maintained in an equilibrium state with atmosphere below 23° C., after then joining strength is measured.

TABLE 4

Relation between days of storage and shear joining strength of aluminum alloy A5052/SGX120 composites joined by injection molding after high temperature-high humidity test

|  |  | Shear joining strength after high temperature-high humidity test (MPa) | | | | | | |
|---|---|---|---|---|---|---|---|---|
|  | Days of storage (days) | Initial value | after 250 h | after 500 h | after 1000 h | after 2000 h | after 4000 h | after 6000 h |
| Experiment Example 1 (NMT) | Joining by injection molding on instant day | 40.8 | 28.0 | 21.5 | Ceased | | | |
| Experiment Example 2 (NMT 2) | on instant day | 40.5 | 35.0 | 35.7 | 38.4 | 36.0 | 38.0 | 38.4 |
|  | after 1 week | 40.8 | 35.5 | 34.2 | 30.3 | 25.5 | 22.8 | Ceased |
|  | after 2 weeks | 40.3 | 32.3 | 32.4 | 29.0 | 23.7 | 20.1 | Ceased |
| Experiment Example 3 (NMT 7) | on the day next to instant day | 41.0 | 36.5 | 35.0 | 38.5 | 37.6 | 38.4 | 37.7 |
|  | after 2 weeks | 41.5 | 35.0 | 37.4 | 38.1 | 38.5 | 38.5 | 38.1 |
| Experiment Example 10 (NMT 7-Oxy) | on the day next to instant day | 40.8 | 34.7 | 35.0 | 37.4 | 36.0 | 36.2 | 36.3 |
|  | after 2 weeks | 41.5 | 35.0 | 37.4 | 38.0 | 38.5 | 36.2 | 37.1 |

TABLE 4-continued

Relation between days of storage and shear joining strength of aluminum alloy A5052/SGX120 composites joined by injection molding after high temperature-high humidity test

| | | Shear joining strength after high temperature-high humidity test (MPa) | | | | | | |
|---|---|---|---|---|---|---|---|---|
| | Days of storage (days) | Initial value | after 250 h | after 500 h | after 1000 h | after 2000 h | after 4000 h | after 6000 h |
| Experiment Example 11 (Ano-7) | on the day next to instant day | 41.0 | 40.1 | 36.5 | 37.2 | 37.5 | 37.8 | 36.5 |
| | after 2 weeks | 41.6 | 39.7 | 35.0 | 37.4 | 37.8 | 36.5 | 35.5 |
| Experiment Example 12 (NMT 8) | on the day next to instant day | 41.0 | 38.3 | 35.3 | 39.5 | 38.5 | 39.2 | 38.5 |
| | after 2 weeks | 41.8 | 38.3 | 34.3 | 37.0 | 38.1 | 38.5 | 38.1 |

TABLE 5

Relation between days of storage and shear joining strength of various aluminum alloys treated by NMT 8/ SGX120 composites joined by injection molding after high temperature-high humidity test

| | | | Shear joining strength after high temperature-high humidity test (MPa) | | | | | | |
|---|---|---|---|---|---|---|---|---|---|
| | Species of Al alloy | Days of storage (days) | Initial value | after 250 h | after 500 h | after 1000 h | after 2000 h | after 4000 h | after 6000 h |
| Experiment Example 13 (NMT 8) | A7075 | Joining by injection molding on the day next to instant day | 41.0 | 40.1 | 38.0 | 38.7 | 37.5 | 37.7 | 38.0 |
| | | after 2 weeks | 41.5 | 40.4 | 38.0 | 38.4 | 37.0 | 37.4 | 37.4 |
| Experiment Example 14 (NMT 8) | A6063 | on the day next to instant day | 41.5 | 36.8 | 37.5 | 37.5 | 36.8 | 37.2 | 36.6 |
| | | after 2 weeks | 41.8 | 37.4 | 36.9 | 37.1 | 36.8 | 37.0 | 36.8 |
| Experiment Example 15 (NMT 8) | A6061 | on the day next to instant day | 41.5 | 33.3 | 38.5 | 40.0 | 37.8 | 37.5 | 37.0 |
| | | after 2 weeks | 41.0 | 31.3 | 38.6 | 37.1 | 37.5 | 38.0 | 37.5 |
| Experiment Example 16 (NMT 8) | A2017 | on the day next to instant day | 41.5 | 38.7 | 39.0 | 39.6 | 36.6 | 37.5 | 37.2 |
| | | after 2 weeks | 41.8 | 39.8 | 39.7 | 39.7 | 37.7 | 37.6 | 37.2 |
| Experiment Example 17 (NMT 8) | ADC12 | on the day next to instant day | 41.5 | 38.7 | 36.0 | 37.6 | 37.5 | 38.0 | 37.6 |
| | | after 2 weeks | 41.7 | 39.8 | 35.3 | 37.2 | 38.2 | 38.5 | 38.0 |

(Experiment Example 22) Test of Moisture Resistance and Heat Resistance of Joining Strength of Composites Joined by Injection Molding Using PPS Resin (Referential Example)

Experiment Example 22 is test under wet-heat load (referential example) in which composites are placed in a high temperature-high humidity test machine for a long time. There are metal or metal alloy species that has, for the species themselves, precisely more durable to moisture (more difficult to rust) than aluminum alloy materials. Specifically, Ti alloy, stainless steel SUS304, stainless steel SUS430 are named as such. The present inventors are developing innovated new NMT treatment method also for these various metal species, making best endeavor. This is implemented considering, as an object, that use of such materials are required as parts members for moving machines, machines or facilities used in outdoor circumstances.

As a new method of surface treatment developed for attaining the object cannot be disclosed here, because it has no relation with the method of surface treatment disclosed in the present invention at all. However, Ti alloy or others were treated by various new methods of surface treatment that were already accomplished accordingly and composites of the metal pieces and "SGX120" joined by injection molding were prepared. Examples of measured joining strength of the composites and property of moisture resistance and heat resistance of the joining strength are shown in Table 6 as referential example.

TABLE 6

Shear joining strength of various metal alloy/SGX120 composites joined by injection molding after high temperature-high humidity test

| | | | Shear joining strength after high temperature-high humidity test (MPa) | | | | | | |
|---|---|---|---|---|---|---|---|---|---|
| | Species of metal alloy | Days of storage (days) | Initial value | after 250 h | after 500 h | after 1000 h | after 2000 h | after 4000 h | after 6000 h |
| | 64 Ti alloy | Joining by injection molding on the day next to instant day | 41.2 | 38.5 | 38.4 | 37.8 | 36.8 | 35.5 | 35.4 |

TABLE 6-continued

Shear joining strength of various metal alloy/SGX120 composites joined by injection molding after high temperature-high humidity test

| Species of metal alloy | Days of storage (days) | Shear joining strength after high temperature-high humidity test (MPa) | | | | | | |
|---|---|---|---|---|---|---|---|---|
| | | Initial value | after 250 h | after 500 h | after 1000 h | after 2000 h | after 4000 h | after 6000 h |
| SUS304 | Joining by injection molding on the day next to instant day | 41.5 | 34.0 | 32.7 | 30.8 | 30.0 | 28.3 | 25.4 |
| SUS430 | Joining by injection molding on the day next to instant day | 40.5 | 18.0 | 13.7 | Ceased | | | |

While the surface treatment method for the various metal alloys shown in FIG. 6 is not described here in detail, the present inventors, having succeeded in attaining high property of moisture resistance and heat resistance of aluminum alloy by new NMT type of surface treatment, devoted all energy to attain property of moisture resistance and heat resistance of joining strength of composites joined by injection molding, in which titanium material and stainless steel that are difficult to rust even in hot water are joined with "SGX120", thus improving surface treatment method. While initial new NMT treatment method for stainless steel or titanium material is disclosed in Patent Documents 4 and 5, the present inventors improved this. As a result, composites having property of moisture resistance and heat resistance in a highest level near to that of aluminum alloy according to the present invention were obtained recently for Ti alloy as shown in FIG. 6. Also for SUS304, property of moisture resistance and heat resistance of its joining strength has been improved far from the level of composites joined by injection molding dealt with by previous new NMT treatment.

While composites of 64 Ti alloy or SUS304 with "SGX120" joined by injection molding exhibit excellent result regarding property of moisture resistance and heat resistance of their joining strength as shown in Table 6, there is a situation such that the joining strength is lowered consistently, though various in the level, as time lapses within a high temperature-high humidity test machine. That is, there is no unusualness here such that joining strength is recovered, after once lowered, and then stabilized as certified with aluminum alloy, etc., treated by NMT 7 shown in Table 4. This is a quite distinct physical property of joined composites remarked by comparing Al alloy with other metal species. This is probably caused by a circumstance such that only composites of Al alloy joined by injection molding is different from those of other metals or metal alloys joined by injection molding in mechanism itself from joined state to breaking in a course of long years.

(Experiment Example 23) Moisture Resistance and Heat Resistance of Joining Strength of Composites Joined by Injection Molding of Aluminum Alloy Treated by NMT 7 Treatment with "1:1" Resin (Test with a High Temperature-High Humidity Test Machine)

Experiment Example 23 is test under wet-heat load by placing in high temperature-high humidity test machine set to be at 85° C. and humidity of 85% for a long time. In a case where aluminum alloy A5052 was stored for two weeks and then joined by injection molding with "SGX120" as a PPS resin, property of moisture resistance and heat resistance of joining strength of the resulting composite was not in a highest level as shown in Experiment Examples 18 and 19. Before methods by NMT 7 treatment, etc., have been developed, it was studied to overcome this result by using "SGX115" as a PPS resin having a low water absorbability. As a result, using dry blend resin of "SGX115" and "SGX120" in a ratio of 1:1, composites were obtained such that their property of moisture resistance and heat resistance is not substantially lowered if days of storage are of a week. Here, joining strength was lowered by nearly 10% to be about 37 MPa for shear joining strength and about 33 MPa for tensile joining strength, with 1:1 blend resin. In short, this was in a level such that property of moisture resistance and heat resistance is improved a little although joining strength is lowered by nearly 10% compared with use of "SGX120".

Test for certifying what physical property of joining is exhibited with the present invention using this "1:1" dry blend resin was implemented. Just in case, days of storage was 4 weeks. Result of this is shown in Table 7.

TABLE 7

Shear joining strength of various aluminum alloys/SGX120-SGX115 composites joined by injection molding after high temperature-high humidity test

| | Species of Al alloy | Days of storage (days) | Shear joining strength after high temperature-high humidity test (MPa) | | | | | | |
|---|---|---|---|---|---|---|---|---|---|
| | | | Initial value | after 250 h | after 500 h | after 1000 h | after 2000 h | after 4000 h | after 6000 h |
| Experiment Example 3 (NMT 7) | A5052 | Joining by injection molding after 4 weeks | 36.2 | 32.5 | 34.0 | 36.3 | 35.8 | 35.5 | 35.1 |

TABLE 7-continued

Shear joining strength of various aluminum alloys/SGX120-SGX115 composites joined by injection molding after high temperature-high humidity test

| | Species of Al alloy | Days of storage (days) | Shear joining strength after high temperature-high humidity test (MPa) | | | | | | |
|---|---|---|---|---|---|---|---|---|---|
| | | | Initial value | after 250 h | after 500 h | after 1000 h | after 2000 h | after 4000 h | after 6000 h |
| Experiment Example 5 (NMT 7) | A6063 | Joining by injection molding after 4 weeks | 37.0 | 33.1 | 35.0 | 34.0 | 34.5 | 33.5 | 34.6 |
| Experiment Example 6 (NMT 7) | A1100 | Joining by injection molding after 4 weeks | 37.0 | 34.1 | 35.9 | 37.9 | 36.4 | 36.5 | 36.2 |

As seen apparently in Table 7, property of moisture strength and heat resistance was so excellent as to be said "sufficient". Here, joining strength is yet lower by about 10% than in a case of "SGX120". Comparing the result in Table 7 with the results for composites using "SGX120" in Tables 4 and 5, both are superior in moisture resistance and heat resistance of joining strength. To say in another way, this seems to mean that ability is attained to a saturated level and it is difficult to take one as superior to the other. Hence, it seemed to have not so significant meaning in using "1:1" resin providing low joining strength. However, it is possible for excess quality to be alive in an extraordinary circumstance. As such, it was thought that these could be used as parts materials adapted to specific sites, for example, sites in moving machines or outdoor facilities that is usually surrounded by moisture or water drops, sites easily exposed to steam or sites with possibility of submersion in water.

What is claimed is:

1. A method for manufacturing a composite of aluminum alloy, comprising steps of:
preparing, through chemical treatment and anodization, an aluminum alloy having surface configuration of threefold irregularities such that a rough surface having surface roughness of 10 to 100 μm period is observed with an electron microscope in a magnification of 1,000 times, a surface having fine irregularities of 1 to 5 μm period based on crystal grain boundary is observed with an electron microscope in a magnification of 10,000 times and a surface having ultrafine irregularities of 30 to 100 nm period with porous structure is confirmed with an electron microscope in a magnification of 100,000 times,
causing amine molecules to be chemically adsorbed onto the surface having ultrafine irregularities with porous structure of the aluminum alloy formed by chemical treatment and anodization,
inserting the aluminum alloy into a metallic mold for injection molding, and
injecting a resin composition into the metallic mold for injection molding having the aluminum alloy inserted therein to join the aluminum alloy integrally with resin composition, said resin composition consisting of a total resin part and a filler part, the total resin part containing a polyphenylene sulfide resin as a main component by 70 mass % or more of a resin part, and a modified polyolefin resin as an auxiliary component by 30 mass % or less of the resin part, and further containing a resin of third component having ability for promoting compatibility of the polyphenylene sulfide resin and the modified polyolefin resin, and the filler part of reinforcing fiber being 15 to 30 mass % of the entire resin composition.

2. The method for manufacturing a composite of aluminum alloy according to claim 1, wherein a joining strength between two parts of an integrated entity of the aluminum alloy and the resin composition as a molded entity is high as equal to or greater than 30 MPa for both of shear joining strength and tensile joining strength.

* * * * *